US009483660B2

(12) United States Patent
Bura

(10) Patent No.: US 9,483,660 B2
(45) Date of Patent: Nov. 1, 2016

(54) ENTERPRISE CONTENT MANAGEMENT PLATFORM VALIDATOR

(71) Applicant: BANK OF AMERICA CORPORATION, Charlotte, NC (US)

(72) Inventor: Chiranjeevi Bura, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 14/567,409

(22) Filed: Dec. 11, 2014

(65) Prior Publication Data

US 2016/0171245 A1 Jun. 16, 2016

(51) Int. Cl.
*G06F 17/00* (2006.01)
*G06F 21/64* (2013.01)
*G06F 17/30* (2006.01)

(52) U.S. Cl.
CPC ......... *G06F 21/64* (2013.01); *G06F 17/30371* (2013.01)

(58) Field of Classification Search
CPC ..................... G06F 21/577; G06F 2221/2101; G06F 8/60; G06F 8/61; G06F 17/30144; G06F 17/30303; G06F 17/30309; G06F 17/30371; G06F 17/30507; G06F 17/30563; G06F 17/30864; G06Q 10/06; G06Q 10/087; G06Q 10/10; G06Q 20/3823; G06Q 20/04; H04M 1/67; H04M 1/72525; H04M 1/72566; H04M 1/72572; H04M 1/72577; H04W 12/06; H04W 12/08; H04W 48/04; H04W 4/021; H04W 84/12; H04W 8/205; G06N 99/005
USPC .............................................................. 726/7
See application file for complete search history.

(56) References Cited

U.S. PATENT DOCUMENTS

2008/0215678 A1* 9/2008 Coletrane ............... H04L 51/04 709/204
2008/0307262 A1* 12/2008 Carlin, III ......... G06F 17/30303 714/37

* cited by examiner

*Primary Examiner* — Kambiz Zand
*Assistant Examiner* — Abiy Getachew
(74) *Attorney, Agent, or Firm* — Michael A. Springs; Moore & Van Allen PLLC; Anup Shrinivasan

(57) ABSTRACT

The present invention is directed to a system that enables a user (an associate, a data specialist, a researcher, an adjuster, an agent, a teller, or the like) of a financial institution to quickly and accurately validate a repository of an enterprise content management platform. The user typically utilizes the system of the present invention to schedule and/or execute a variety of validation processes for one or more repositories. For example, the user may test read and write capabilities of a particular storage of a server. Once execution of desired validation processes is complete, the system of the present invention generates a report based on the completed validation processes. The generated report may assist the user in identifying unwanted errors in repository performance.

19 Claims, 24 Drawing Sheets

200

APPLICATION 1 VALIDATOR

202
- ENVIRONMENT: XXX
- JVM: XXX
- OBJECT STORE: XX.XX.XXX.XX
- STORAGE POLICY: XX.XX.XXX.XX

204 ACTION TO BE PERFORMED:
- [X] ADD
- [X] DELETE
- [ ] VIEW
- [ ] CREATE VALIDATOR CLASS
- [ ] SEARCH
- [ ] SECURITY VIEW
- [ ] DOWNLOAD DOCUMENT

NO. OF DOCS: X

206 VALIDATE    208 RESET

| ENVIRONMENT | OBJECT STORE | ADD | DELETE | VIEW | SEARCH | VALIDATOR CLASS | SECURITY VIEW |
|---|---|---|---|---|---|---|---|
| ENVIRONMENT 1 | OS 1 | TRUE | TRUE | | | | |

210

LOGS:

XXXXXXXX DOCUMENT ADDITION STARTED XXXXXXXX

XXXX-XX-XX XX:XX:XX.XXX
SERVER URL: XXXXXXXXX

212

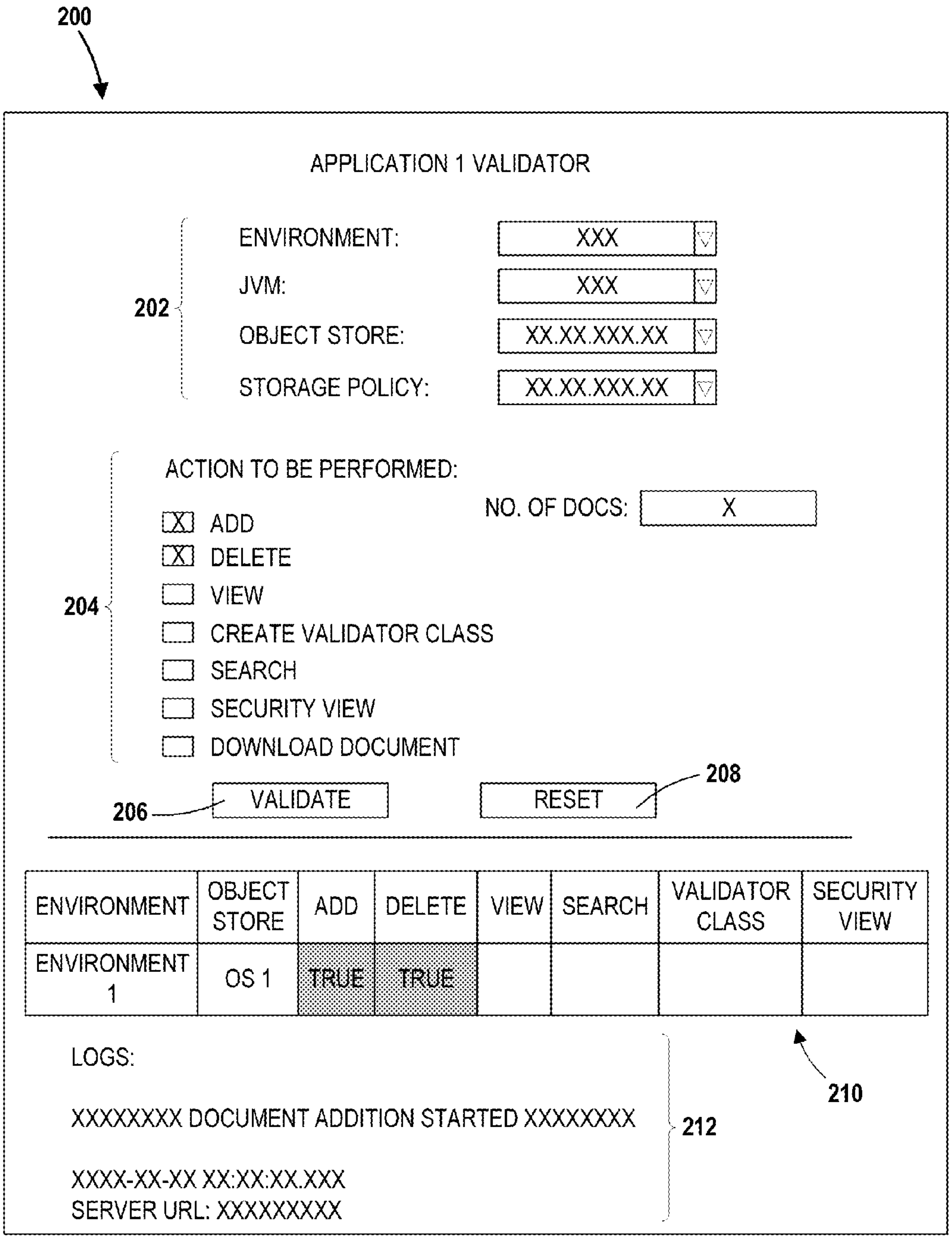

| ENVIRONMENT TYPE | SERVER 1 | SERVER 2 | SERVER 3 |
|---|---|---|---|
| ENVIRONMENT TYPE 1 | APPLICATION 1<br>APPLICATION 2 | N/A | APPLICATION 29<br>APPLICATION 30<br>APPLICATION 31 |
| ENVIRONMENT TYPE 2 | APPLICATION 3<br>APPLICATION 4<br>APPLICATION 5 | APPLICATION 19<br>APPLICATION 20 | APPLICATION 32 |
| ENVIRONMENT TYPE 3 | APPLICATION 6 | APPLICATION 21<br>APPLICATION 22<br>APPLICATION 23 | APPLICATION 33<br>APPLICATION 34 |
| ENVIRONMENT TYPE 4 | APPLICATION 7<br>APPLICATION 8<br>APPLICATION 9 | APPLICATION 24 | APPLICATION 35 |
| ENVIRONMENT TYPE 5 | APPLICATION 10<br>APPLICATION 11<br>APPLICATION 12<br>APPLICATION 13 | APPLICATION 25<br>APPLICATION 26 | APPLICATION 36<br>APPLICATION 37<br>APPLICATION 38<br>APPLICATION 39 |
| ENVIRONMENT TYPE 6 | APPLICATION 14<br>APPLICATION 15 | N/A | N/A |
| ENVIRONMENT TYPE 7 | N/A | APPLICATION 27<br>APPLICATION 28 | APPLICATION 40<br>APPLICATION 41<br>APPLICATION 42 |
| ENVIRONMENT TYPE 8 | APPLICATION 16<br>APPLICATION 17<br>APPLICATION 18 | N/A | APPLICATION 43<br>APPLICATION 44<br>APPLICATION 45<br>APPLICATION 46 |

FIGURE 23

ENTERPRISE CONTENT MANAGEMENT PLATFORM VALIDATOR

BACKGROUND

During ECM (Enterprise Content Management) Platform maintenance, one or more underlying infrastructure products and/or applications may be validated to ensure proper and consistent functionality. Validation of the one or more products and or applications may include determining read, write, or delete capabilities of a particular storage location, determining contents of a particular storage location, status of services running or the like. However, because of potentially high volumes of products and or applications that are to be validated, validation may be a very time-consuming process (particularly if it is done manually). Therefore, there is a need for a tool that enables a user to automate ECM Platform validation processes.

BRIEF SUMMARY

The present invention is directed to a system that enables a user (an associate, a data specialist, a researcher, an adjuster, an agent, a teller, or the like) of a financial institution to quickly and accurately validate a FileNet repository of an enterprise content management platform. The user typically utilizes the system of the present invention to execute a variety of validation processes for one or more repositories. For example, the user may test read and write capabilities of a particular storage location of a server. Once execution of desired validation processes is complete, the system of the present invention generates a report based on the completed validation processes. The generated report may assist the user in identifying unwanted errors in repository performance.

In some embodiments, a system for validating a repository is provided. The system comprises: at least one memory; at least one processor; and at least one module stored in memory, executable by the at least one processor, and configured for: receiving repository identification information; identifying at least one repository to be validated based on the received repository identification information; receiving one or more validation criteria for validating the at least one repository to be validated; validating the at least one repository to be validated by executing the one or more validation criteria; and generating a validation report of the at least one identified repository based on validation of the at least one identified repository to be validated.

In some embodiments, the repository identification information comprises at least one of an environment name, an application name, a file name, a database name, web logic, an object store name, a storage policy, an Internet Protocol (IP) address, user authentication information, and user identification (ID) associated with the at least one repository to be validated.

In some embodiments, one or more validation criteria comprises instructions to execute at least one of adding, deleting, retrieving, and downloading data to or from the at least one repository to be validated, viewing data stored in the at least one repository to be validated, searching for data stored in the at least one repository to be validated, viewing security and authentication preferences of the at least one repository to be validated, determining a pool capacity, an amount of free space, a version, a status, a name, an identification number, or read and write capabilities of the at least one repository to be validated, validating user credentials for user access to the at least one repository to be validated, validating a session specification, retrieving group information for a user, and starting, stopping, or pausing operation of the at least one repository to be validated.

In some embodiments, the module is further configured for: determining if the at least one repository to be validated has been validated; requesting from a user one or more validation criteria for validating the at least one repository to be validated and validating the at least one repository to be validated based the one or more validation criteria when it is determined that the at least one repository to be validated has not been validated; and generating a validation report based on validation of the at least one repository to be validated when it is determined that the at least one repository to be validated has been validated.

In some embodiments, the module is further configured for generating a validation request based on the received repository identification information and received one or more validation criteria for validating the at least one repository to be validated.

In some embodiments, at least one of the repository identification information and the one or more validation criteria for validating the at least one repository to be validated is received from a mobile device associated with a user.

In some embodiments, generating the validation report comprises generating a log of the validation of the at least one repository to be validated based on the one or more validation criteria.

In some embodiments, the module is further configured for transmitting the validation report to a second apparatus after generation of the validation report.

In some embodiments, validating the at least one repository to be validated further comprises: generating at least one validation repository; associating the at least one validation repository with the at least one repository to be validated; and utilizing only the validation repository when executing the one or more validation criteria during validation of the at least one repository to be validated.

In some embodiments, the repository identification information is received based on a user selection from a bookmark page.

In some embodiments, the module is further configured for: identifying one or more errors associated with the repository to be validated; and enabling an authenticated user to correct the one or more identified errors.

In some embodiments, a method for validating a repository is provided. The method comprises: receiving, by a computing device processor, repository identification information; identifying, by a computing device processor, at least one repository to be validated based on the received repository identification information; receiving, by a computing device processor, one or more validation criteria for validating the at least one repository to be validated; validating, by a computing device processor, the at least one repository to be validated by executing the one or more validation criteria; and generating, by a computing device processor, a validation report of the at least one identified repository based on validation of the at least one identified repository to be validated.

In some embodiments, a computer program product for validating a repository is provided. The computer program product comprises a non-transitory computer-readable medium comprising code causing an apparatus to: receive repository identification information; identify at least one repository to be validated based on the received repository identification information; receive one or more validation criteria for validating the at least one repository to be validated; validate the at least one repository to be validated by executing the one or more validation criteria; and generate a validation report of the at least one identified repository based on validation of the at least one identified repository to be validated.

The system of the present invention provides many benefits. First, the system of the present invention drastically reduces the amount of time it takes to validate one or more ECM [Enterprise Content Management] repositories. Second, validation of one or more repositories ensures proper and consistent functionality of the repositories, and therefore more efficient reading and writing of information. Third, generating a report of executed validation processes further enables the user to identify errors in repository performance more clearly. Clearly, the system of the present invention saves a financial institution a considerable amount of time and resources when maintaining ECM repositories.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Figure 1:
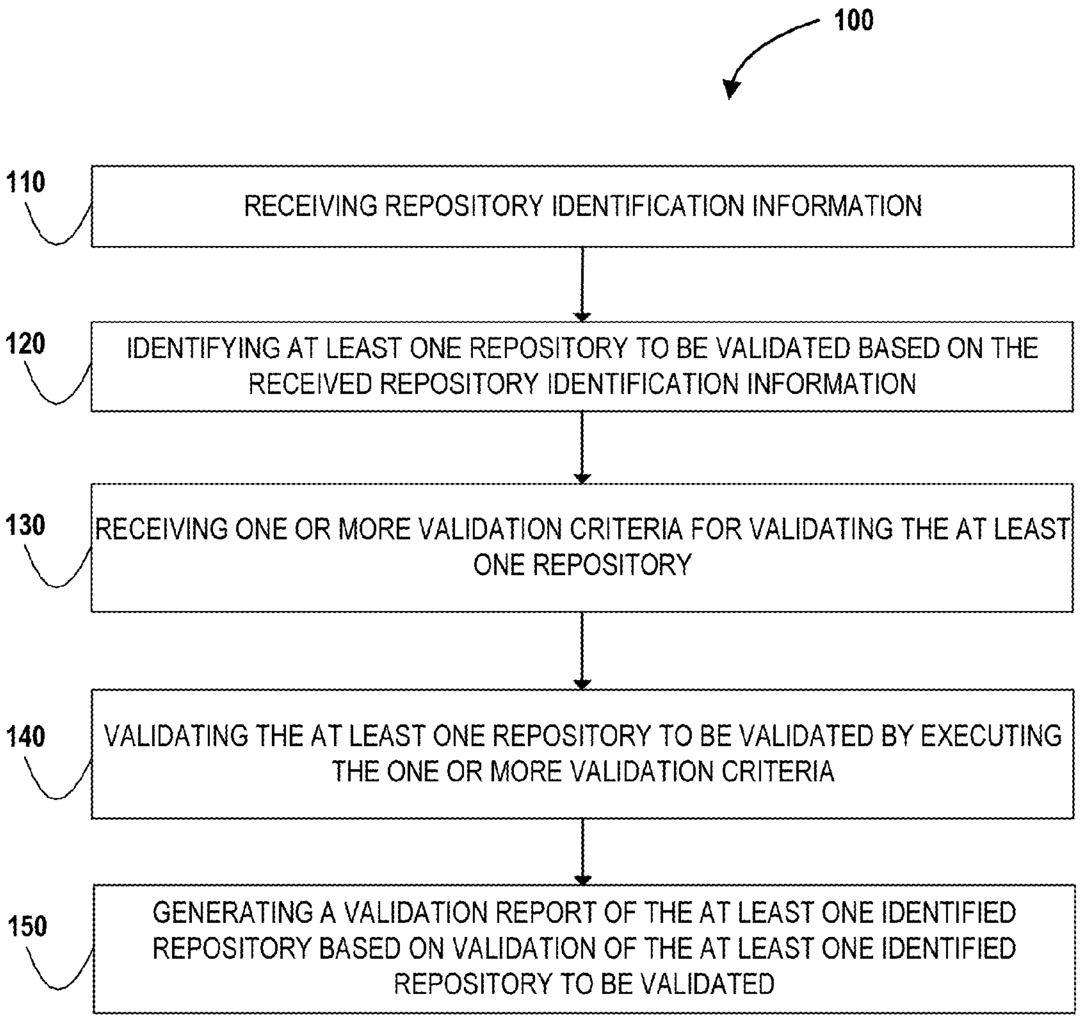
Figure 3:
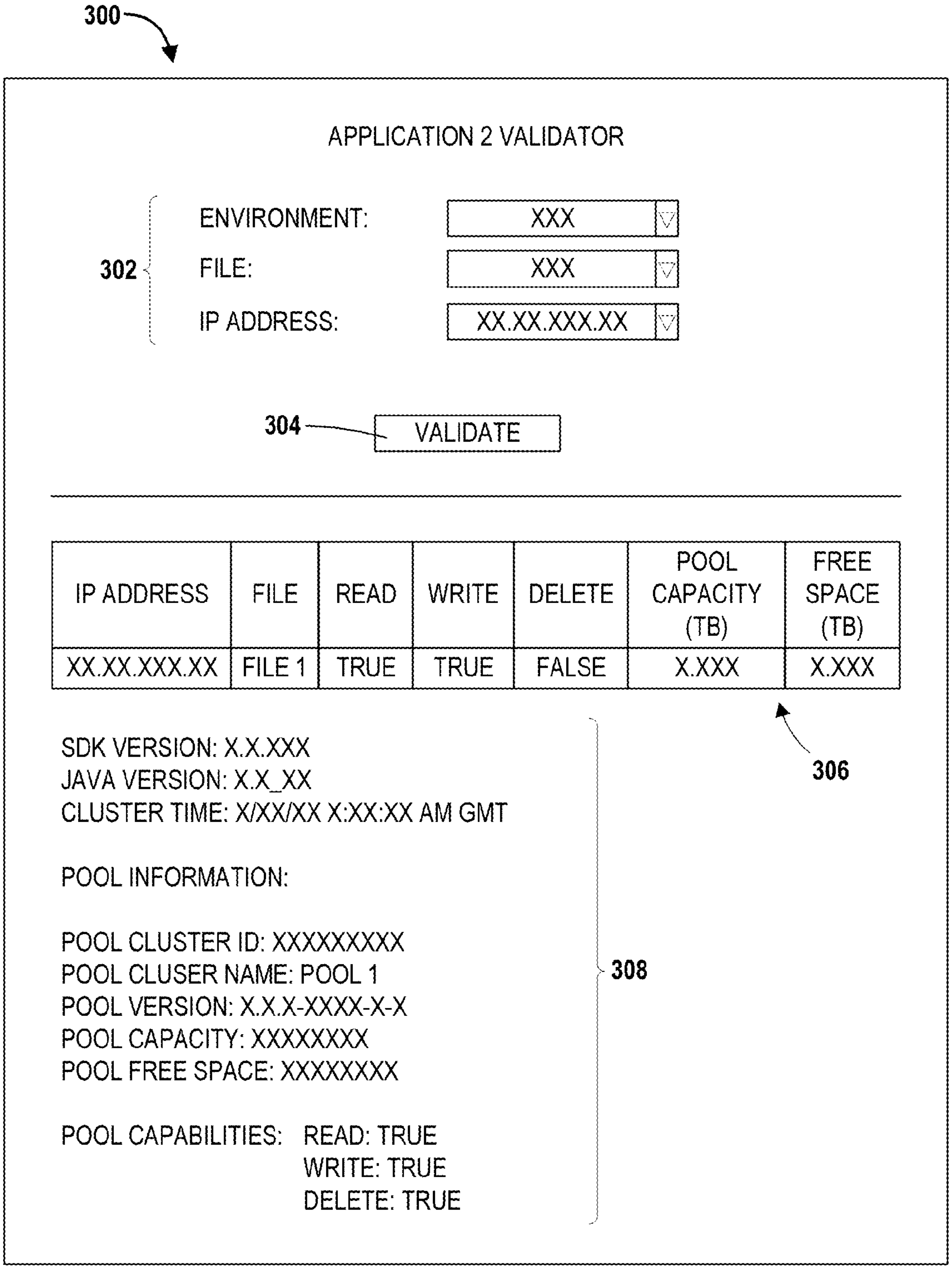
Figure 4:
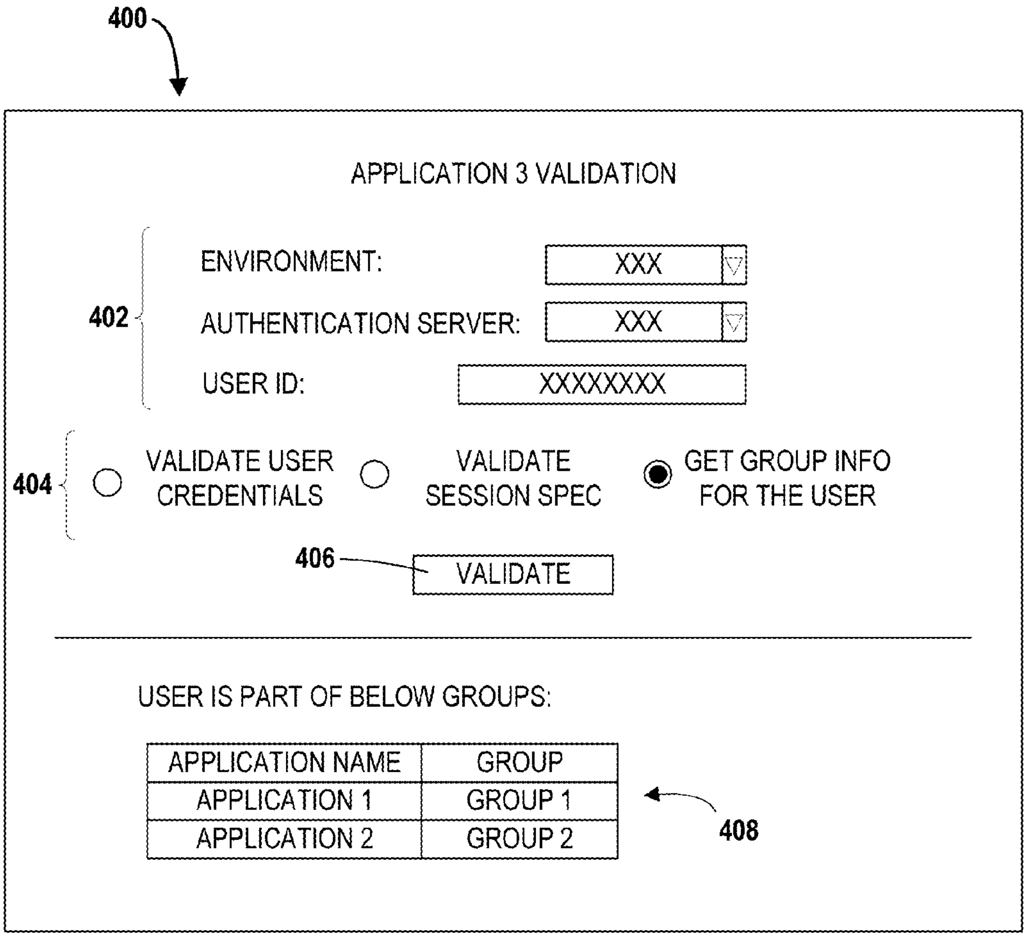
Figure 5:
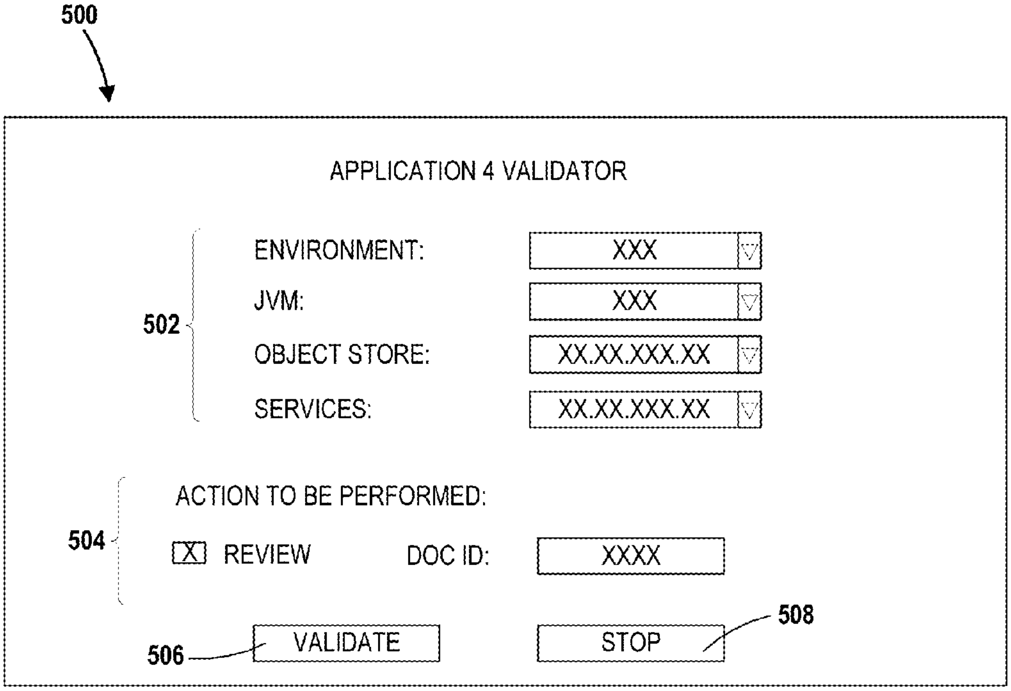
Figure 6:
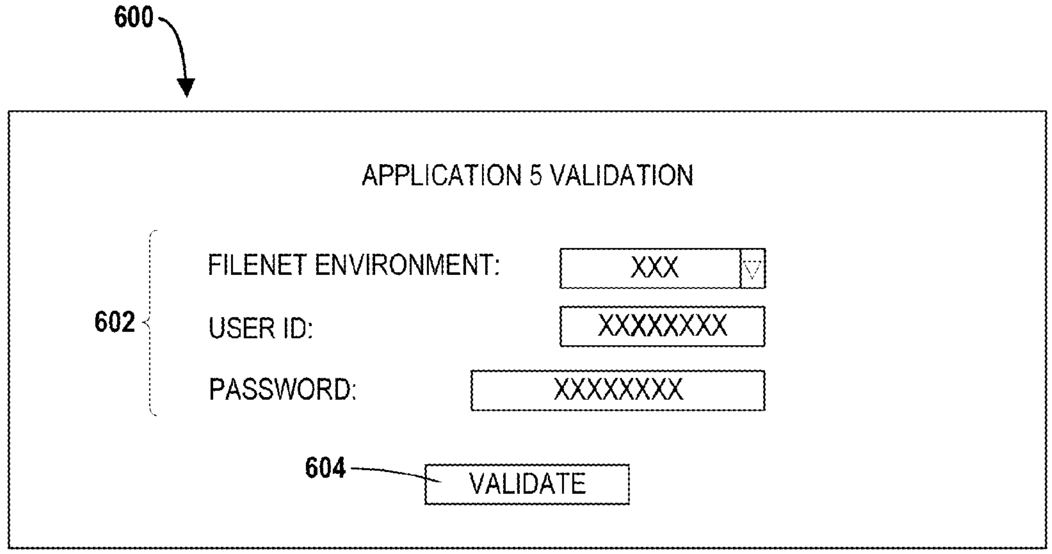
Figure 7:
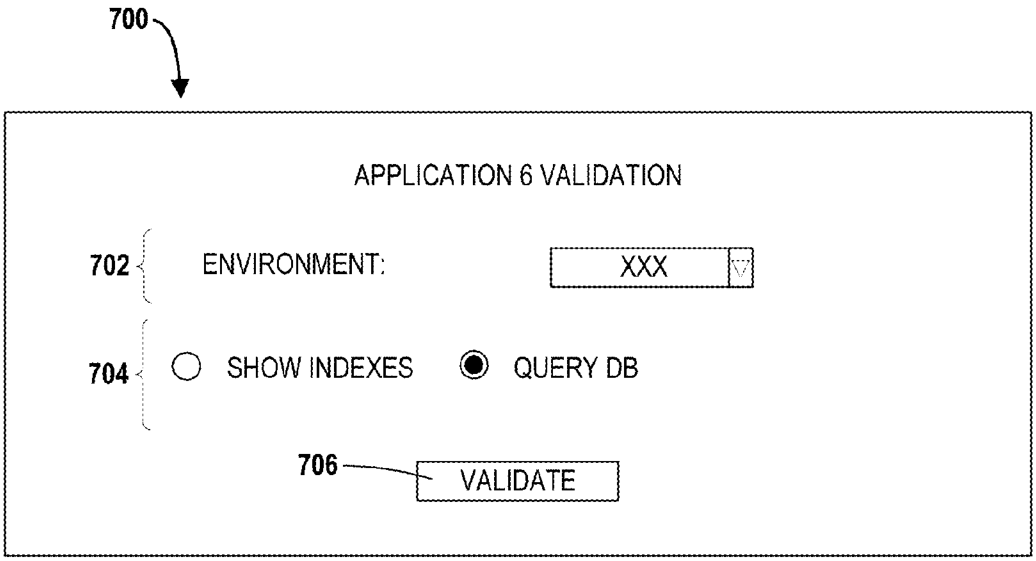
Figure 8:
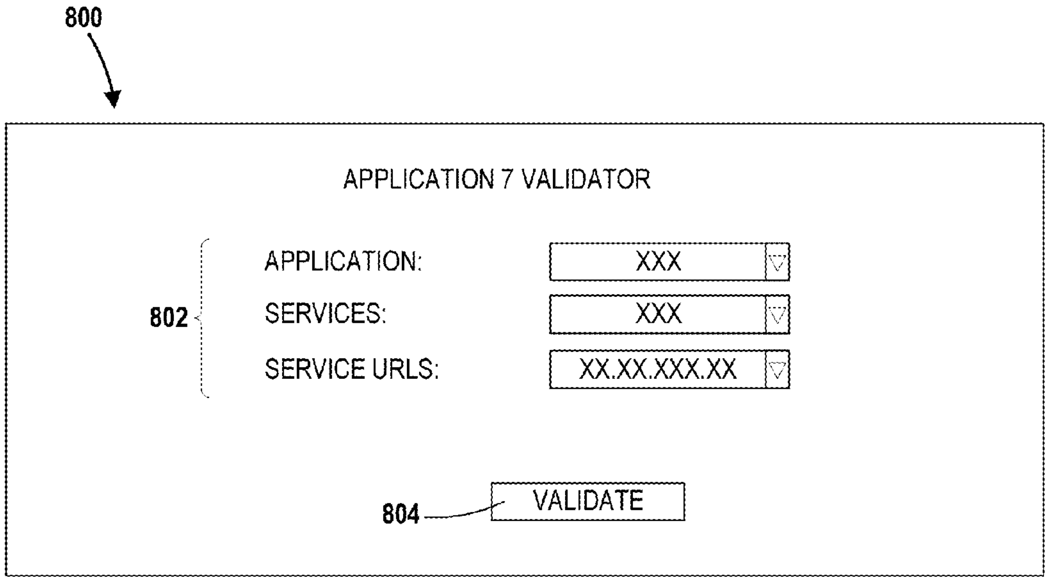
Figure 9:
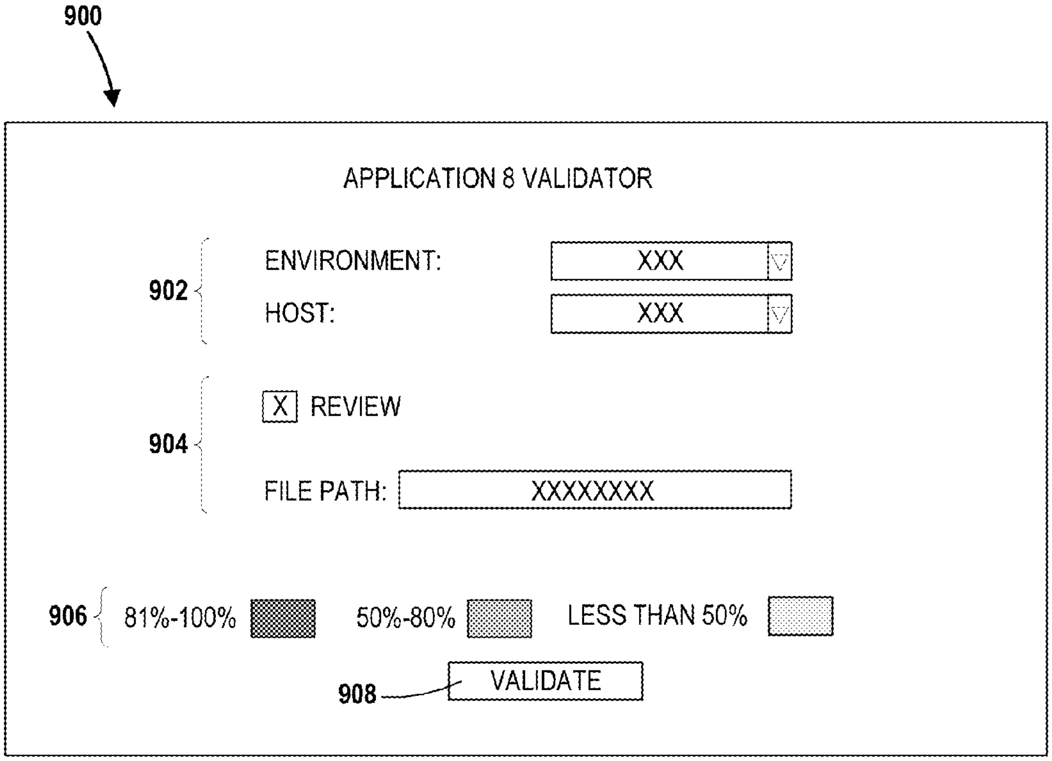
Figure 10:
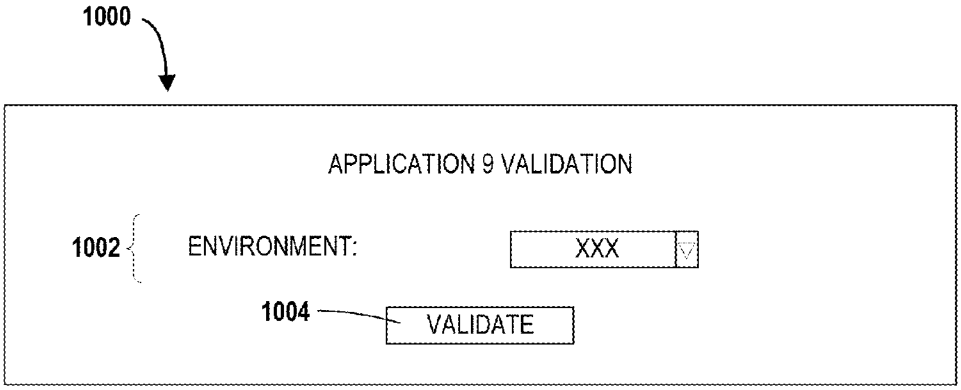
Figure 11:
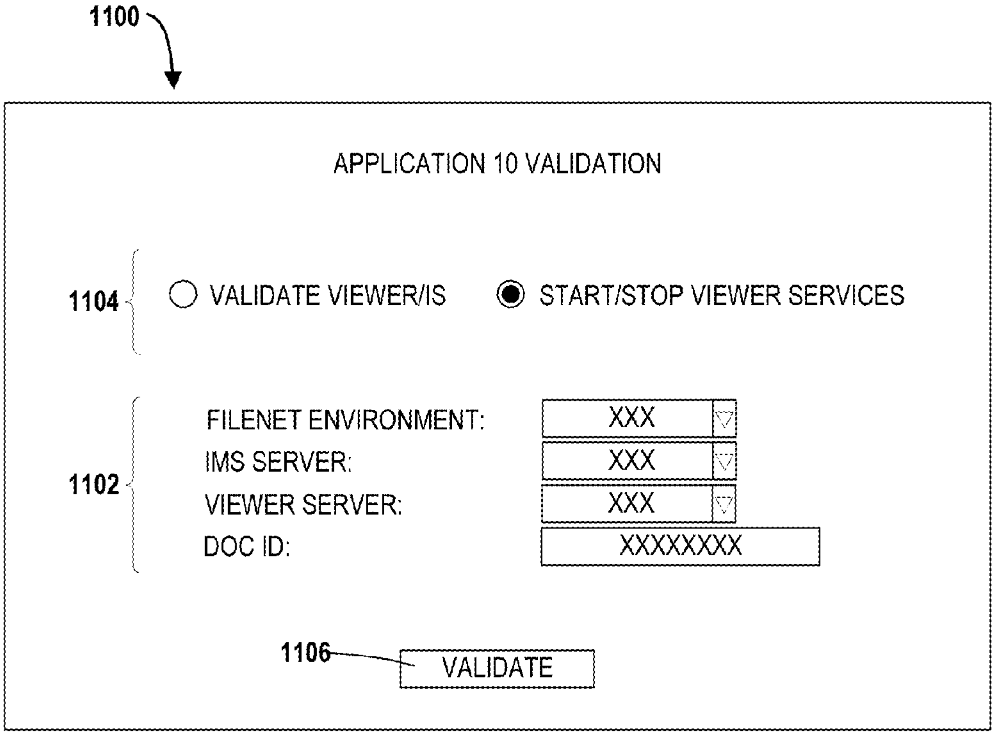
Figure 12:
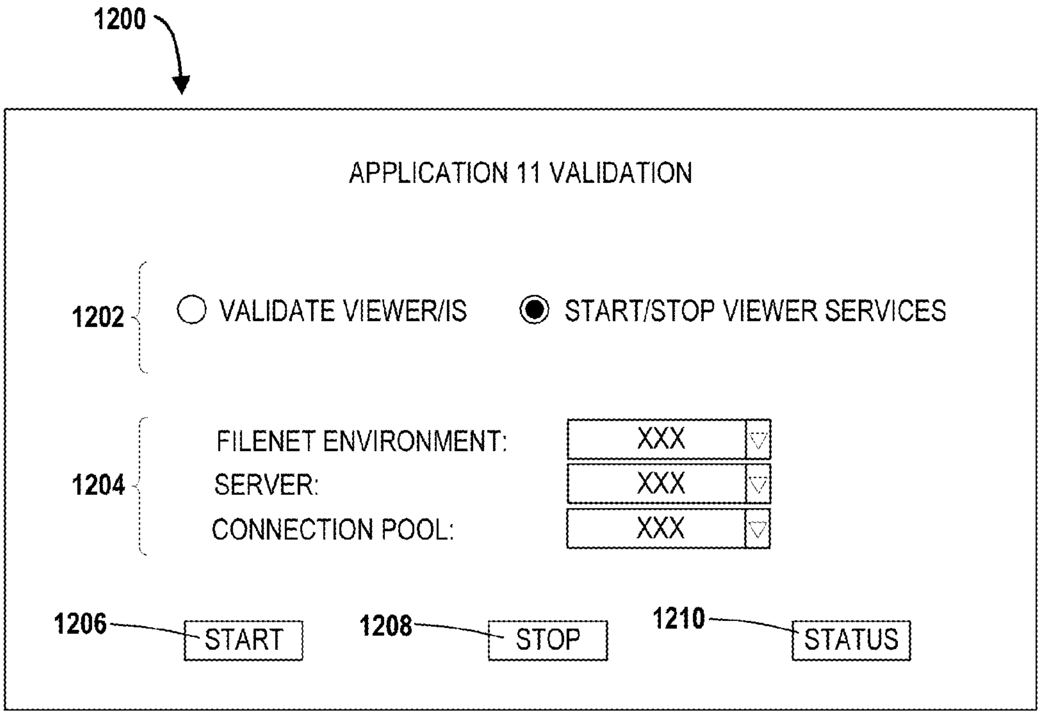
Figure 13:
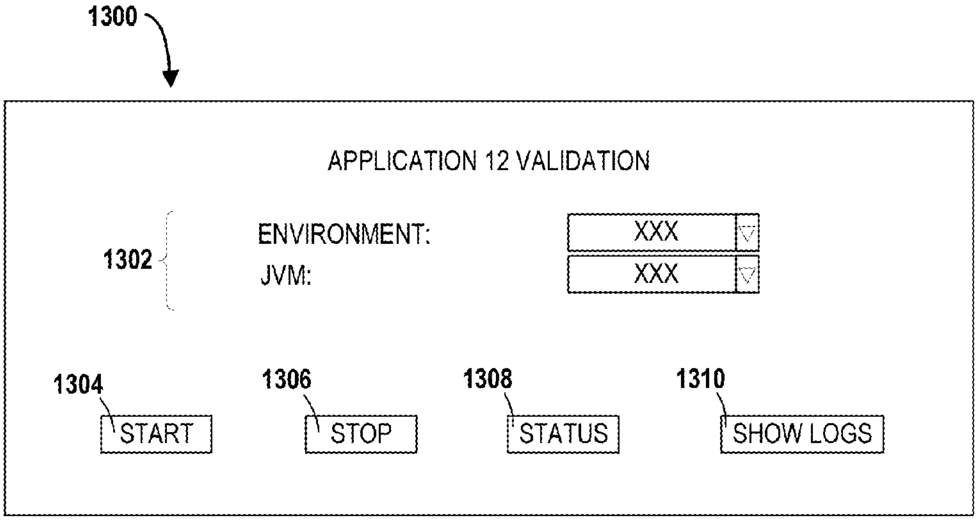
Figure 14:
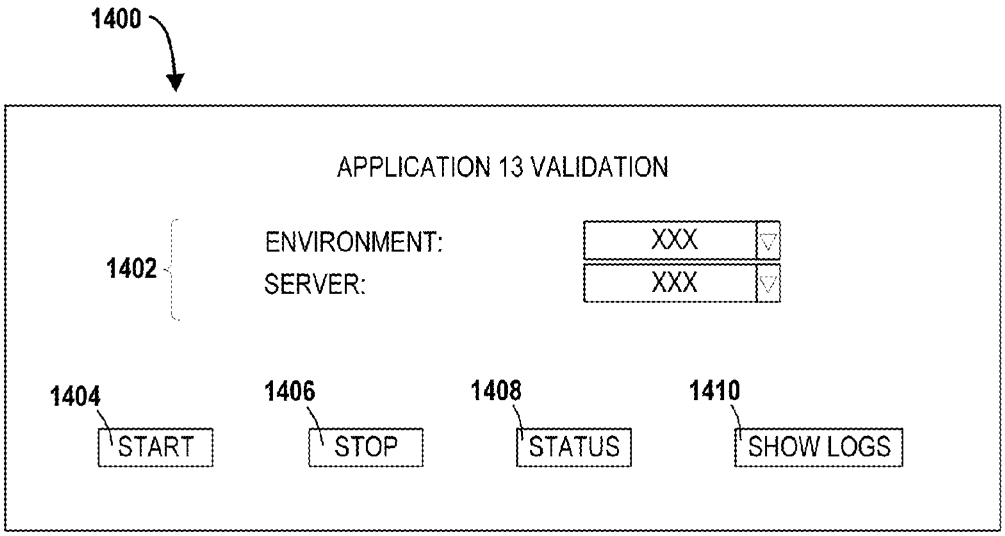
Figure 15:
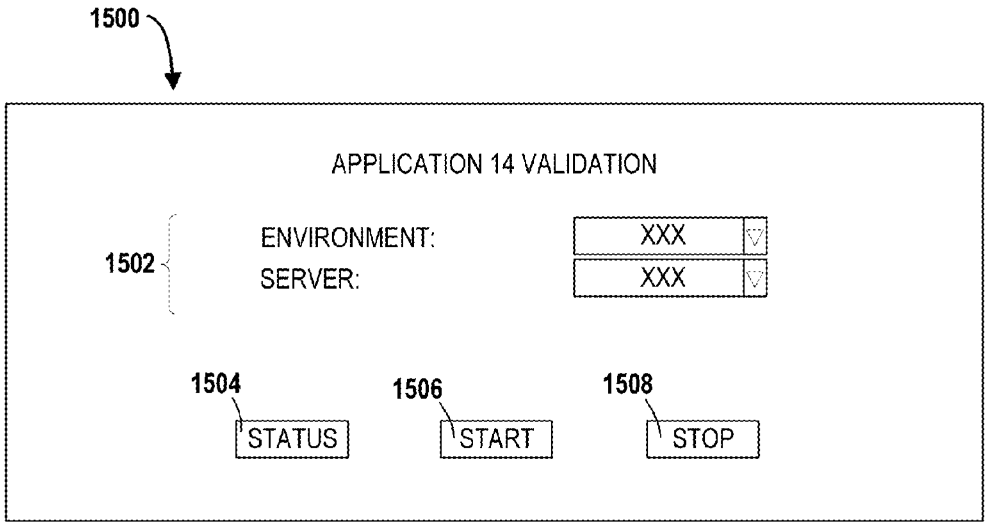
Figure 16:
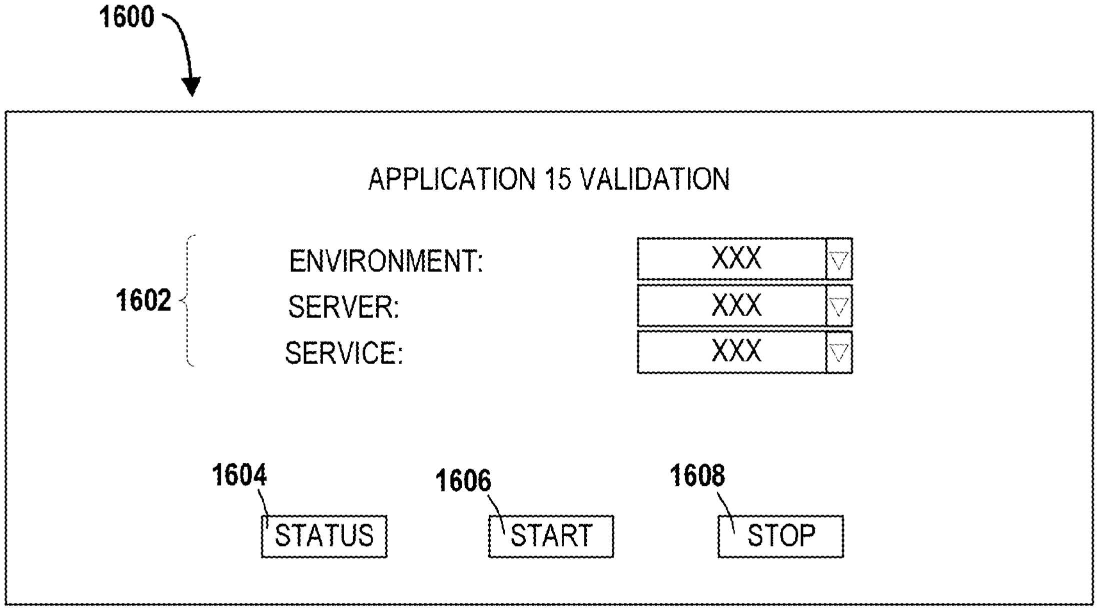
Figure 17:
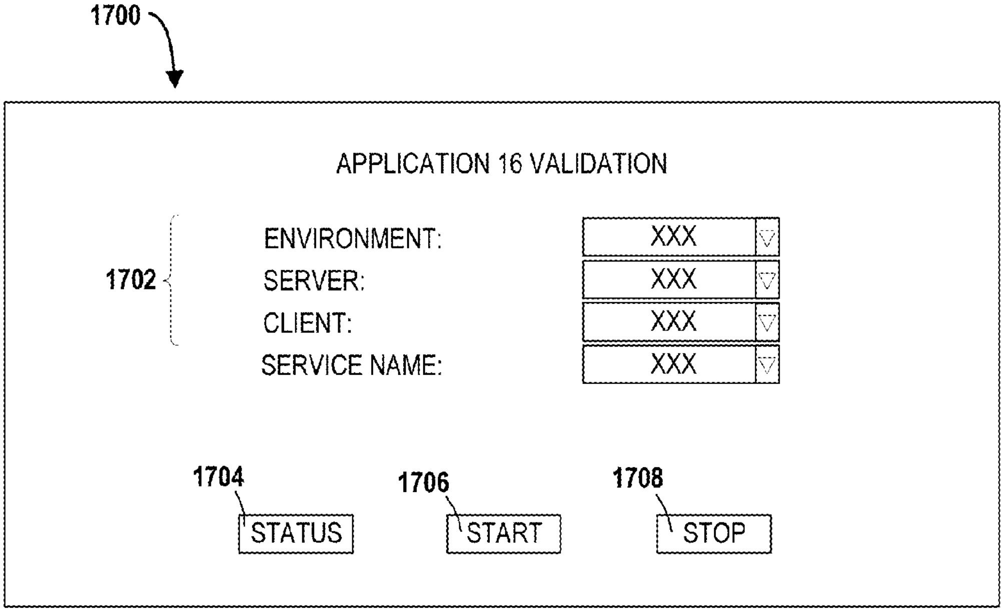
Figure 18:
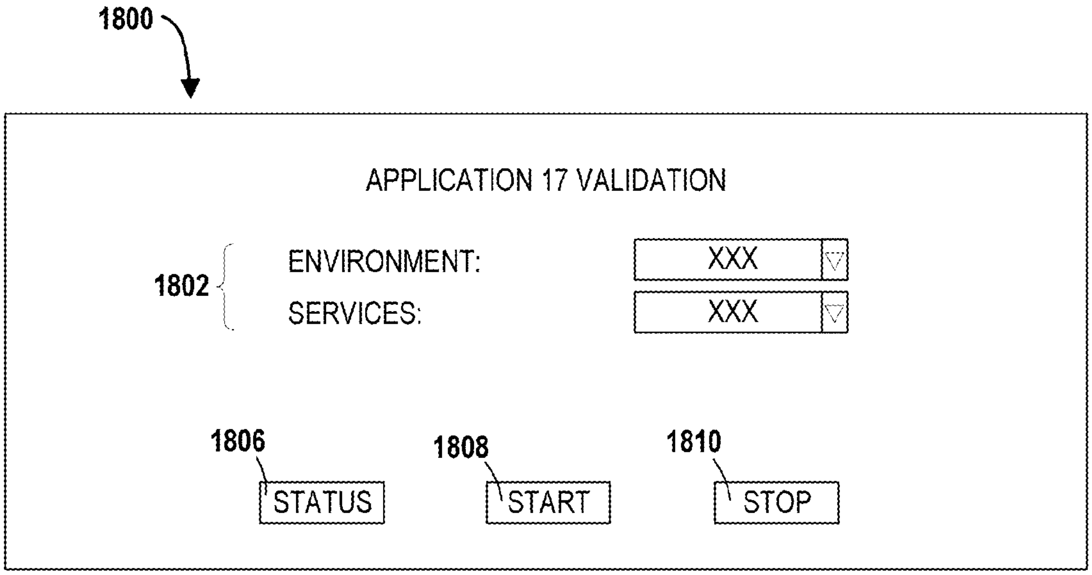
Figure 19:
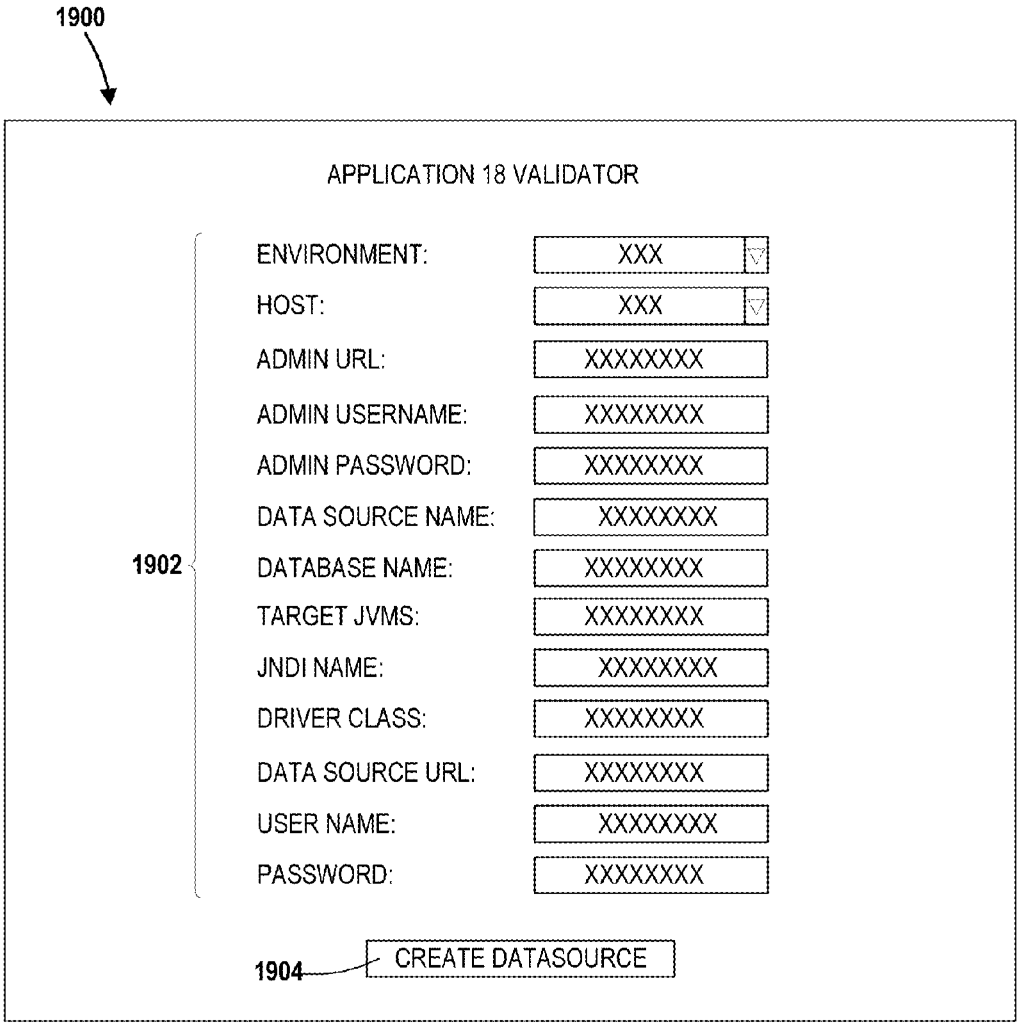
Figure 20:
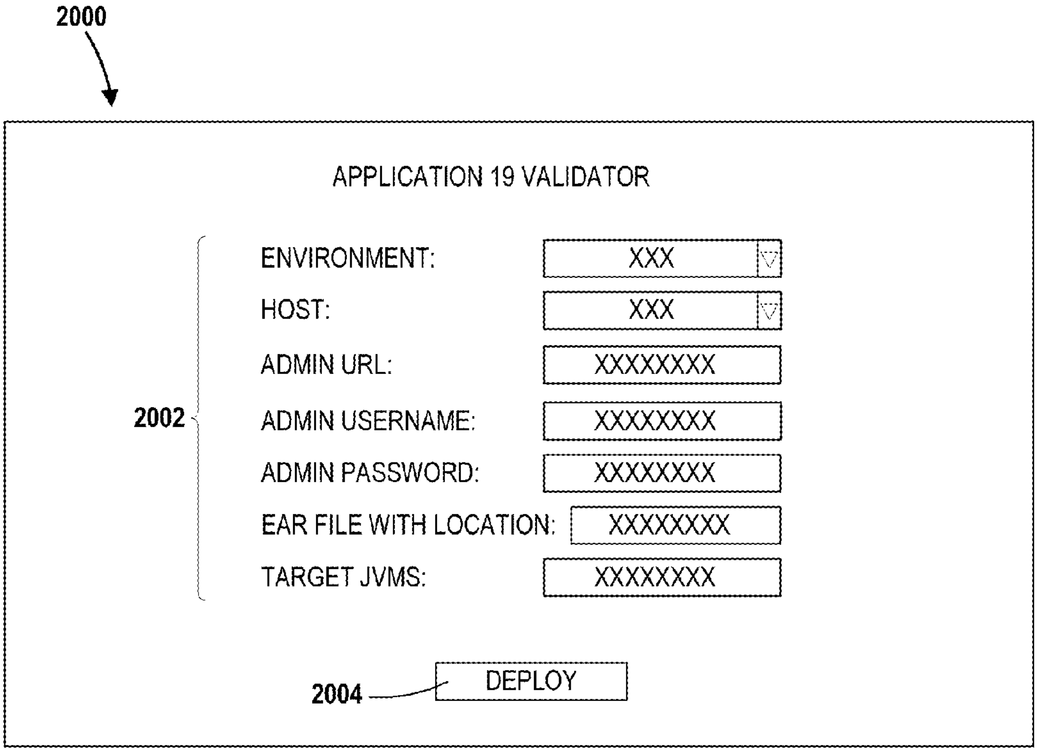
Figure 21:
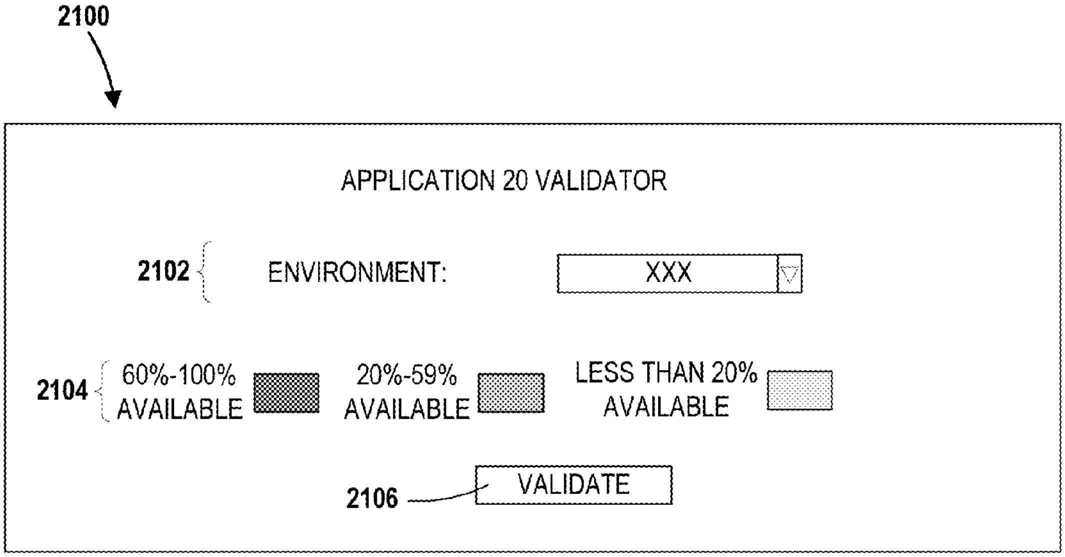
Figure 22:
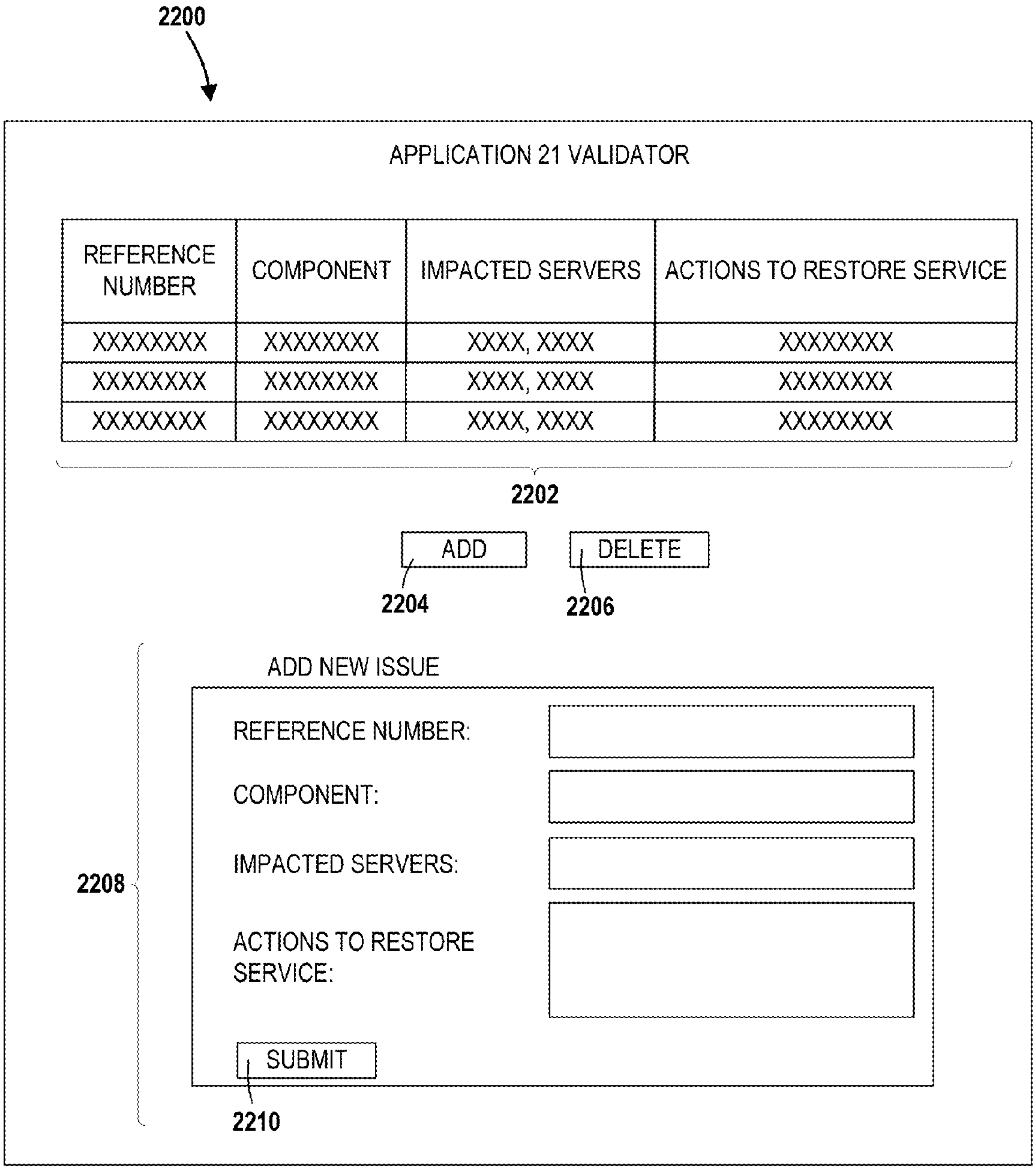
Figure 24:
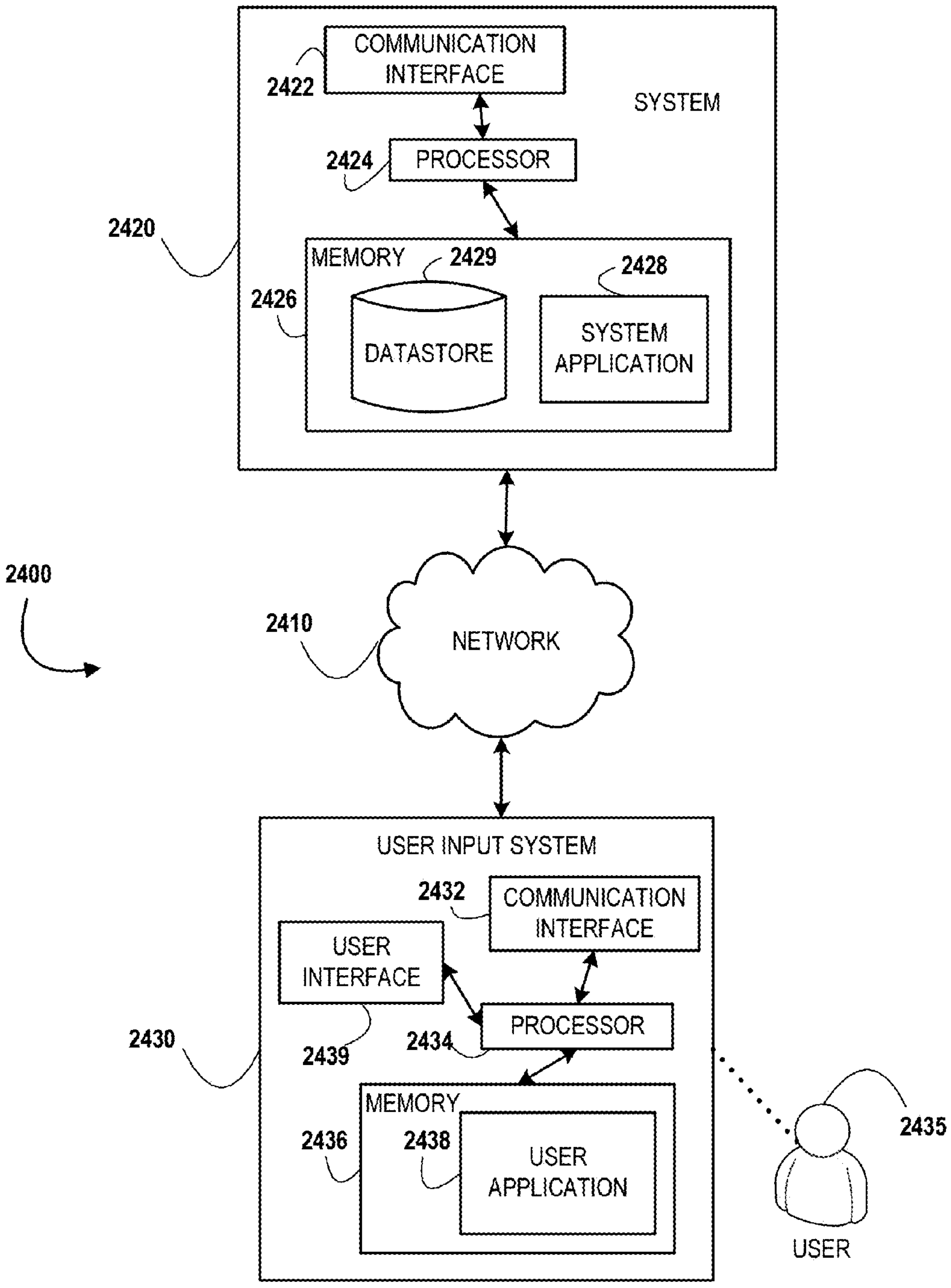

Having thus described embodiments of the invention in general terms, reference will now be made to the accompanying drawings, where:

FIG. 1 is an exemplary process flow illustrating a process for validating a repository, in accordance with embodiments of the present invention;

FIG. 2 is an exemplary user interface for a first validation application, in accordance with embodiments of the present invention;

FIG. 3 is an exemplary user interface for a second validation application, in accordance with embodiments of the present invention;

FIG. 4 is an exemplary user interface for a third validation application, in accordance with embodiments of the present invention;

FIG. 5 is an exemplary user interface for a fourth validation application, in accordance with embodiments of the present invention;

FIG. 6 is an exemplary user interface for a fifth validation application, in accordance with embodiments of the present invention;

FIG. 7 is an exemplary user interface for a sixth validation application, in accordance with embodiments of the present invention;

FIG. 8 is an exemplary user interface for a seventh validation application, in accordance with embodiments of the present invention;

FIG. 9 is an exemplary user interface for an eighth validation application, in accordance with embodiments of the present invention;

FIG. 10 is an exemplary user interface for a ninth validation application, in accordance with embodiments of the present invention;

FIG. 11 is an exemplary user interface for a tenth validation application, in accordance with embodiments of the present invention;

FIG. 12 is an exemplary user interface for an eleventh validation application, in accordance with embodiments of the present invention;

FIG. 13 is an exemplary user interface for a twelfth validation application, in accordance with embodiments of the present invention;

FIG. 14 is an exemplary user interface for a thirteenth validation application, in accordance with embodiments of the present invention;

FIG. 15 is an exemplary user interface for a fourteenth validation application, in accordance with embodiments of the present invention;

FIG. 16 is an exemplary user interface for a fifteenth validation application, in accordance with embodiments of the present invention;

FIG. 17 is an exemplary user interface for a sixteenth validation application, in accordance with embodiments of the present invention;

FIG. 18 is an exemplary user interface for a seventeenth validation application, in accordance with embodiments of the present invention;

FIG. 19 is an exemplary user interface for an eighteenth validation application, in accordance with embodiments of the present invention;

FIG. 20 is an exemplary user interface for a nineteenth validation application, in accordance with embodiments of the present invention;

FIG. 21 is an exemplary user interface for a twentieth validation application, in accordance with embodiments of the present invention;

FIG. 22 is an exemplary user interface for a twenty-first validation application, in accordance with embodiments of the present invention;

FIG. 23 is an exemplary user interface for an application bookmark page menu, in accordance with embodiments of the present invention; and FIG. 24 is an exemplary system environment for a repository validation system, in accordance with embodiments of the present invention.

DETAILED DESCRIPTION OF THE PRESENT INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In other embodiments, an "entity" may not be a financial institution.

As used herein, the term "user" refers to anyone who interacts with the present invention. Typically, the user is an associate (e.g., an employee, agent, contractor, or the like) of a financial institution (e.g., the entity) who is responsible for validating ECM repositories (e.g., storage, data store, database, servers, or the like). The user may be a data processing specialist, a researcher, an information technology specialist, a teller, or another type of associate.

The present invention is directed to a system that enables a user (an associate, a data specialist, a researcher, an adjuster, an agent, a teller, or the like) of a financial institution to quickly and accurately validate a repository of an enterprise content management platform (e.g., a system application, a backend software application or database management system, a network, and/or the like). The user typically utilizes the system of the present invention to schedule and/or execute a variety of validation processes for one or more repositories. For example, the user may test read and write capabilities of a particular storage of a server. Once execution of desired validation processes is complete, the system of the present invention generates a report based on the completed validation processes. The generated report may assist the user in identifying unwanted errors in repository performance.

The system of the present invention provides many benefits. First, the system of the present invention drastically reduces the amount of time it takes to validate one or more ECM repositories. Second, validation of one or more ECM repositories ensures proper and consistent functionality of the repositories, and therefore more efficient reading and writing of information. Third, generating a report of executed validation processes further enables the user to identify errors in repository performance more clearly. Clearly, the system of the present invention saves a financial institution a considerable amount of time and resources when maintaining ECM repositories.

Referring now to the Figures, FIG. 1 is an exemplary process flow 100 for validating an ECM repository. As stated above, a repository may include any type of data storage such as a storage location on a server, a hard disk or hard drive, a datastore, a database, a cache, a memory, or the like. Additionally, a repository may refer to an environment, an application, web logic, an object store, a file system, underlying network connectivity, or the like, or a repository associated with (e.g., corresponding to) an environment, an application, web logic, an object store, or the like. For the purposes of the present invention, one or more repositories are to be validated (e.g., processed) by the system of the present invention.

At block 110, the process includes receiving repository identification information. Repository identification information may include an environment name, an application name, a file name, a database name, a datastore name, web logic, an object store name, a storage policy, an Internet Protocol (IP) address, user authentication information, and user identification (ID), or the like. Typically, the repository identification information is associated with (e.g., corresponds to) the one or more repositories to be validated. So, the repository identification information is used as information that enables the system of the present invention to identify the one or more repositories to be validated by the system of the present invention.

The repository identification information is typically inputted by the user from the user interface. For example, the user may select or input one or more pieces of information that enables the system of the present invention to identify the one or more repositories to be validated. The user may input or select the repository identification information on a second device that is configured to communicate with the system of the present invention, such as a mobile device, a smart phone, a tablet, a wearable device, a desktop computing device, a laptop, or the like. In this way, the repository identification information is transmitted from the device associated with the user (e.g., the user's smart phone) to the system of the present invention, where the repository identification information is then received. Receiving repository identification information from the user's mobile device, for example, enables validation processes to be scheduled and/or run from any location, thereby increasing efficiency of data processing and repository validation processes.

In some embodiments, the system of the present invention may prompt the user (e.g., transmit a request to the user or the user's device) to make a selection of one or more repositories to be validated, input a repository name, a repository location, or other repository identification information. Alternatively, the system of the present invention may receive repository identification information in another fashion, such as importing preexisting repository identification information from an application, a spreadsheet, another device, or the like. For example, in one embodiment the system of the present invention may receive repository identification information based on a user selection from a bookmark page (see FIG. 5 and paragraph [0049]). In another embodiment, the system of the present invention may store the received repository identification information in a storage location for recall.

At block 120, the process includes identifying at least one repository to be validated based on the received identification information. The system of the present invention is configured to process the received identification information to identify exactly which storage location (e.g., repository) within a server, database, or the like is to be validated. The system of the present invention may identify at least one repository to be validated substantially simultaneously to receiving repository identification information, or at any time after receiving repository identification information. In alternative embodiments, the user may be required to make a selection or confirm the one or more repositories to be validated.

After one or more repositories have been identified, the system of the present invention may determine if the identified one or more repositories have already been validated. Inclusion of this determination step in validation processes is purposed to minimize duplication of work during validation processes, thereby increasing overall efficiency. In response to determining that the identified one or more repositories have already been validated, the system of the present invention is configured to initiate generation of a validation report based on the prior validation of the identified one or more repositories (see block 150 of FIG. 1 and paragraph [0036]-[0038] below for references to the validation report generation). In response to determining that the identified one or more repositories have not yet been validated, the system of the present invention is configured to prompt the user (e.g., initiate and transmit a request to the user) for one or more validation criteria for validating the identified one or more repositories to be validated.

At block 130, the process includes receiving one or more validation criteria. Validation criteria are pieces of information that provide instructions to the system of the present invention for which types of validation are to be executed (e.g., validation processes). For example, the user may input appropriate validation criteria to communicate a desire to test a repository's read and write capabilities. One or more validation criteria may be inputted and/or selected by the user (or received from the user, a device associated with the user, or another device) so that a combination of validation processes are executed when validating the identified one or more repositories. Alternatively, only one validation criterion may be selected so that only one validation process is executed when validating the identified one or more repositories. Examples of validation criteria include but is not limited to instructions for the system of the present invention to execute at least one of adding, deleting, retrieving, and downloading data to or from the identified one or more repositories to be validated, viewing data stored in the identified one or more repositories to be validated, searching for data stored in the identified one or more repositories to be validated, viewing security and authentication preferences of the identified one or more repositories to be validated, determining a pool capacity, an amount of free space, a version, a status, a name, an identification number, or read and write capabilities of the identified one or more repositories to be validated, validating user credentials for user access to the identified one or more repositories to be validated, validating a session specification, retrieving group information for a user, and starting, stopping, or pausing operation of the identified one or more repositories to be validated.

The system of the present invention may receive the one or more validation criteria in a manner similar to receiving the repository identification information. For example, the system of the present invention may receive the one or more validation criteria from the user's mobile device, another application (e.g., a third party application, a spreadsheet, or the like), or another device.

After receipt of the one or more validation criteria, the system of the present invention is configured to, in some embodiments, generate a validation request to validate the identified one or more repositories based on the validation processes specified by the received one or more validation criteria. The validation request may include a script of the repository identification information, the identified one or more repositories to be validated, and/or the one or more validation criteria for validating the identified one or more repositories. The script is typically translated from the received information, inputs, and/or selections into machine-readable code so that the system of the present invention is enabled to initiate validation of the identified one or more repositories according to the one or more validation criteria as specified in the script.

At block 140, the process includes validating the identified one or more repositories to be validated by executing the one or more validation criteria. In some embodiments, validation of the identified one or more repositories may include the system of the present invention executing the generated script of the validation request. In other embodiments, validating the identified one or more repositories includes executing the one or more validation criteria for the identified one or more repositories. For example, during validation, the system of the present invention may add a file to an identified repository to test the repository's write capabilities. Conversely, during validation, the system of the present invention may view or download a file to an identified repository to test the repository's read capabilities. Another type of validation may be viewing user security or authentication settings for access to various repositories.

One or more actions (e.g., validation criteria) may occur during validation of the identified one or more repositories. Therefore, only one action may occur to only one repository. Alternatively, only one action may occur to a plurality of repositories or all repositories. Similarly, a plurality of actions may occur to only one repository, multiple repositories, or all repositories.

Additionally, the system of the present invention may generate at least one validation repository and associate the generated at least one validation repository with the identified one or more repositories to be validated. In this way, the system of the present invention is configured to interact with only the at least one validation repository for validation purposes. Therefore, data stored in the identified one or more repositories to be validated will not be modified, thus ensuring accuracy of information and efficiency of validation processes while reducing risks of data modification.

At block 150, the process includes generating a validation report of the identified one or more repositories based on validation of the identified one or more repositories to be validated. The validation report typically includes a summary of any validation criteria on which the identified one or more repositories was validated. For example, as seen in FIGS. 2 through 4 (elements 210, 306, and 408 respectively), the validation report provides a summary of each validation criterion evaluated. In some embodiments, the validation report is color-coded or shaded for quick and accurate visual review.

The validation report may further include a log of the validation of the identified one or more repositories. The log may include a script of repository contents, repository information such as a name, an IP address, a time and date of creation, validation, or modification, a hyperlink to a server or a storage location, a software developer kit (SDK) version, a software version, information such as an ID, a version, a status, a storage capacity, or an amount of free space, or capabilities such as read capabilities, write capabilities, delete capabilities, or the like, as well as any notes inputted by the user.

In some embodiments the generated validation report may be transmitted to an apparatus. For example, the validation report may be transmitted by the system of the present invention to the user's mobile device for review by the user. Alternatively, the validation report may be transmitted by the system of the present invention to a device associated with a team of analysts who are tasked to identify and/or correct any errors in the identified one or more repositories based on the validation. In other embodiments, the system of the present invention may be configured to automatically identify one or more errors associated with the identified one or more repositories based on the executed validation processes (e.g., executed validation criteria). Additionally, the system of the present invention may enable the user to correct or modify preferences, settings, or data stored within the identified one or more repositories to eliminate the error. For example, the user may be prompted for inputs regarding settings or preferences associated with a server or storage location identified as problematic. In this way, the system of the present invention provides a more efficient platform for not only identifying but also correcting any errors found in a plurality of storage locations.

User authentication may be required at various times throughout the repository validation processes by the system of the present invention. For example, the user may be required to input authentication credentials (e.g., a username and a password) before inputting repository identification information. In some embodiments, user authentication is required multiple times during validation processes. In other embodiments, the user is required to input user authentication credentials only once (e.g., at the beginning of the validation processes). In this way, the same inputted user authentication credentials may be used to authenticate multiple steps of the validation processes, thus minimizing the number of logins required to validate data. The system of the present invention may or may not store inputted user authentication credentials for future authentications.

FIG. 2 illustrates an exemplary user interface 200 for a first validation application [FileNet P8 Validator]. As described above, the user typically inputs repository identification information into the fields 202 provided. Inputting the repository identification information enables the system of the present invention to identify one or more repositories to be validated. Again, repository identification information may include a variety of identifying information, such as an environment, an application, an object store, a storage policy.

The user then inputs one or more validation criteria into the fields 204 provided. The validation criteria communicate to the system of the present invention exactly which type of validation is to occur (e.g., be executed). For example, the user may select from the fields 204 provided one or more actions, such as adding and deleting a file from the identified one or more repositories. Further, the user may specify a number of documents to be added and deleted. Once the user has inputted or selected the desired validation criteria, the user may initiate validation by selecting the 'Validate' button 206, or reset the form by selecting the 'Reset' button 208.

Upon validation of the identified one or more repositories based on the selected validation criteria, the system of the present invention is configured to then generate a validation report 210. The validation report 210 provides a visual summary of the executed validation processes as seen in FIG. 2. Further, the validation report 210 may include a log 212 which provides references to various servers or repositories that were validated, or a script or other information associated with the executed validation processes. The validation report 210 may be transmitted by the system of the present invention to a second apparatus after validation processes have been executed.

FIG. 3 illustrates an exemplary user interface 300 for a second validation application [Centera Validator]. As described above, the user typically inputs repository identification information into the fields 302 provided. Inputting the repository identification information enables the system of the present invention to identify one or more repositories to be validated. Again, repository identification information may include a variety of identifying information, such as an environment, a file, or an IP address.

As seen in FIG. 3, the user is not required to input one or more validation criteria. The second validation application may be of a type that does not require validation criteria, and instead utilizes a default setting in which validation criteria are predetermined. For example, the validation processes to be executed in FIG. 3 include testing read and write capabilities of identified one or more repositories, as well as providing a storage capacity and remaining free space.

The user may initiate validation by selecting the 'Validate' button 304, which executes the default validation criteria (e.g., validation processes) for the second validation application. Upon validation of the identified one or more repositories based on the default validation criteria, the system of the present invention is configured to then generate a validation report 306. The validation report 306 provides a visual summary of the executed validation processes as seen in FIG. 2. Further, the validation report 306 may include a log 308 which provides references to various servers or repositories that were validated, or a script or other information associated with the executed validation processes as seen in FIG. 3. The validation report 306 may be transmitted by the system of the present invention to a second apparatus after validation processes have been executed.

FIG. 4 illustrates an exemplary user interface 400 for a third validation application [WSUUM Validator]. As described above, the user typically inputs repository identification information into the fields 402 provided. Inputting the repository identification information enables the system of the present invention to identify one or more repositories to be validated. Again, repository identification information may include a variety of identifying information, such as an environment, an authentication server, or a user ID.

The user then inputs one or more validation criteria into the fields 404 provided. The validation criteria communicate to the system of the present invention exactly which type of validation is to occur (e.g., be executed). For example, the user may select from the fields 404 provided one or more actions, such as validating user credentials, validating a session, or getting group information for the user. Once the user has inputted or selected the desired validation criteria, the user may initiate validation by selecting the 'Validate' button 406.

Upon validation of the identified one or more repositories based on the selected validation criteria, the system of the present invention is configured to then generate a validation report 408. The validation report 408 provides a visual summary of the executed validation processes as seen in FIG. 4. The validation report 408 provides a printout of all groups and applications to which the user has access. The same type of validation can be executed for user authentication. The validation report 408 may be transmitted by the system of the present invention to a second apparatus after validation processes have been executed.

FIG. 5 illustrates an exemplary user interface 500 for a fourth validation application [CFS ICI Validator]. As described above, the user typically inputs repository identification information into the fields 502 provided. Inputting the repository identification information enables the system of the present invention to identify one or more repositories to be validated. The repository identification information may include a variety of identifying information, such as an environment, a JVM, an object store, and services. The user may further select an action to be performed 504 such as reviewing a document. The user may be required to input document identification information, such as a document ID, before selecting either to initiate validation 506 or to stop validation 508.

FIG. 6 illustrates an exemplary user interface 600 for a fifth validation application [CSB Validator]. As described above, the user typically inputs web service identification information into the fields 602 provided. Inputting the web service identification information enables the system of the present invention to identify one or more repositories to be validated. The repository identification information may include a variety of identifying information, such as an environment, a user ID, and a password. The user may then select to initiate validation 604. The system of the present invention may not require a user selection of an action to be performed (e.g., validation criteria) based on the type of validation to be executed for a particular repository. Instead, the system of the present invention may validate the identified repository according to default validation criteria.

FIG. 7 illustrates an exemplary user interface 700 for a sixth validation application [Database Validator]. As described above, the user typically inputs database identification information into the fields 702 provided. Inputting the repository identification information enables the system of the present invention to identify one or more databases to be validated. The database identification information may include a variety of identifying information, such as an environment. The user may further select an action to be performed 704 such as showing indexes or a database query.

The user may then select to initiate validation 706 of the selected action to be performed for the identified database to be validated.

FIG. 8 illustrates an exemplary user interface 800 for a seventh validation application [Documentum Validator]. As described above, the user typically inputs repository identification information into the fields 802 provided. Inputting the repository identification information enables the system of the present invention to identify one or more repositories to be validated. The repository identification information may include a variety of identifying information, such as an application, services, and/or service URLs. The user may then select to initiate validation 604. The system of the present invention may not require a user selection of an action to be performed (e.g., validation criteria) based on the type of validation to be executed for a particular repository. Instead, the system of the present invention may validate the identified repository according to default validation criteria.

FIG. 9 illustrates an exemplary user interface 900 for an eighth validation application [FileSystem Validator]. As described above, the user typically inputs repository identification information into the fields 902 provided. Inputting the repository identification information enables the system of the present invention to identify one or more repositories to be validated. The repository identification information may include a variety of identifying information, such as an environment. The user may further select an action to be performed 904 such as reviewing a file, as well as a file path (e.g., location). The interface 900 may further include a key 906 by which the user may evaluate a validation report or result set. The user may then select to initiate validation 908 of the selected action to be performed for the identified repository to be validated.

FIG. 10 illustrates an exemplary user interface 1000 for a ninth validation application [Network Validator]. As described above, the user typically inputs repository identification information into the fields 1002 provided. Inputting the repository identification information enables the system of the present invention to identify one or more repositories to be validated. The repository identification information may include a variety of identifying information, such as an environment. The user may then select to initiate validation 1004. The system of the present invention may not require a user selection of an action to be performed (e.g., validation criteria) based on the type of validation to be executed for a particular repository. Instead, the system of the present invention may validate the identified repository according to default validation criteria.

FIG. 11 illustrates an exemplary user interface 1100 for a tenth validation application [FileNet Viewer/IS Validator]. As described above, the user typically inputs repository identification information into the fields 1102 provided. Inputting the repository identification information enables the system of the present invention to identify one or more repositories to be validated. The repository identification information may include a variety of identifying information, such as an environment, a source server, a viewer server, a document ID, or the like. The user may further select an action to be performed 1104 such as validating a viewer or start and/or stopping viewer services. The user may then select to initiate validation 1106 of the selected action to be performed for the identified repository to be validated.

FIG. 12 illustrates an exemplary user interface 1200 for an eleventh validation application [FileNet Viewer/IS Validator]. As described above, the user typically inputs repository identification information into the fields 1202 provided. Inputting the repository identification information enables the system of the present invention to identify one or more repositories to be validated. The repository identification information may include a variety of identifying information, such as an environment, a server, a connection pool, or the like. The user may further select an action to be performed 1204 such as validating a viewer or start and/or stopping viewer services. The user may then select to initiate validation 1206 of the selected action to be performed for the identified repository to be validated, to stop validation 1208, or to view a status of validation 1210 and/or generate a validation report.

FIG. 13 illustrates an exemplary user interface 1300 for a twelfth validation application [WebLogic Validator]. As described above, the user typically inputs repository identification information into the fields 1302 provided. Inputting the repository identification information enables the system of the present invention to identify one or more repositories to be validated. The repository identification information may include a variety of identifying information, such as an environment. The user may then select to initiate validation 1304, to stop validation 1306, to view a status of validation 1308, or generate a validation report or log 1310. The system of the present invention may not require a user selection of an action to be performed (e.g., validation criteria) based on the type of validation to be executed for a particular repository. Instead, the system of the present invention may validate the identified repository according to default validation criteria.

FIG. 14 illustrates an exemplary user interface 1400 for a thirteenth validation application [Webserver Validator]. As described above, the user typically inputs repository identification information into the fields 1402 provided. Inputting the repository identification information enables the system of the present invention to identify one or more repositories to be validated. The repository identification information may include a variety of identifying information, such as an environment and/or a server. The user may then select to initiate validation 1404, to stop validation 1406, to view a status of validation 1408, or generate a validation report or log 1410. The system of the present invention may not require a user selection of an action to be performed (e.g., validation criteria) based on the type of validation to be executed for a particular repository. Instead, the system of the present invention may validate the identified repository according to default validation criteria.

FIG. 15 illustrates an exemplary user interface 1500 for a fourteenth validation application [Fax Validator]. As described above, the user typically inputs repository identification information into the fields 1502 provided. Inputting the repository identification information enables the system of the present invention to identify one or more repositories to be validated. The repository identification information may include a variety of identifying information, such as an environment and/or a server. The user may then select to view a status of validation 1504, initiate validation 1506, or to stop validation 1508. The system of the present invention may not require a user selection of an action to be performed (e.g., validation criteria) based on the type of validation to be executed for a particular repository. Instead, the system of the present invention may validate the identified repository according to default validation criteria.

FIG. 16 illustrates an exemplary user interface 1600 for a fifteenth validation application [ICC Validator]. As described above, the user typically inputs repository identification information into the fields 1602 provided. Inputting the repository identification information enables the system of the present invention to identify one or more repositories to be validated. The repository identification information may include a variety of identifying information, such as an environment, a server, a service, and/or the like. The user may then select to view a status of validation 1604, to initiate validation 1606 of the selected action to be performed for the identified repository to be validated, to stop validation 1608. The system of the present invention may not require a user selection of an action to be performed (e.g., validation criteria) based on the type of validation to be executed for a particular repository. Instead, the system of the present invention may validate the identified repository according to default validation criteria.

FIG. 17 illustrates an exemplary user interface 1700 for a sixteenth validation application [Input Accel Validator]. As described above, the user typically inputs repository identification information into the fields 1702 provided. Inputting the repository identification information enables the system of the present invention to identify one or more repositories to be validated. The repository identification information may include a variety of identifying information, such as an environment, a server, a client, a service name, and/or the like. The user may then select to view a status of validation 1704, to initiate validation 1706 of the selected action to be performed for the identified repository to be validated, to stop validation 1708. The system of the present invention may not require a user selection of an action to be performed (e.g., validation criteria) based on the type of validation to be executed for a particular repository. Instead, the system of the present invention may validate the identified repository according to default validation criteria.

FIG. 18 illustrates an exemplary user interface 1800 for a seventeenth validation application [Open Client Validator]. As described above, the user typically inputs repository identification information into the fields 1802 provided. Inputting the repository identification information enables the system of the present invention to identify one or more repositories to be validated. The repository identification information may include a variety of identifying information, such as an environment, services, and/or the like. The user may then select to view a status of validation 1806, to initiate validation 1808 of the selected action to be performed for the identified repository to be validated, to stop validation 1810. The system of the present invention may not require a user selection of an action to be performed (e.g., validation criteria) based on the type of validation to be executed for a particular repository. Instead, the system of the present invention may validate the identified repository according to default validation criteria.

FIG. 19 illustrates an exemplary user interface 1900 for an eighteenth validation application [WL Datasource]. As described above, the user typically inputs repository resource information into the fields 1902 provided. Inputting the repository resource information enables the system of the present invention to create a datasource to be part of one or more repositories to be validated. The repository resource information may include a variety of identifying information, such as an environment, a host, an administrator URL, an administrator username, administrator password, a data source name, a database name, target JVMs, a Java naming directory interface (JNDI) name, a driver class, a data source URL, a user name, a password, and/or the like. The user may then select to create a database 1904 according to the inputted repository identification information (e.g., aforementioned instructions for constructing a database inputted in the fields 1902). The system of the present invention may not require a user selection of an action to be performed (e.g., validation criteria) based on the type of validation to be executed for a particular repository. Instead, the system of the present invention may create the identified data source according to default input criteria or other instructions.

FIG. 20 illustrates an exemplary user interface 2000 for a nineteenth validation application [WL Deploy]. As described above, the user typically inputs repository resource information into the fields 2002 provided. Inputting the repository resource information enables the system of the present invention to deploy an application on one or more repositories to be validated. The repository resource information may include a variety of information, such as an environment, a host, an administrator username, an administrator password, an administrator URL, an ear file with location, target JVMs, and/or the like. The user may then select to deploy 2004 the inputted repository identification information. The system of the present invention may not require a user selection of an action to be performed (e.g., validation criteria) based on the type of validation to be executed for a particular repository. Instead, the system of the present invention may deploy an application on the identified repository according to default criteria or other instructions.

FIG. 21 illustrates an exemplary user interface 2100 for a twentieth validation application [WebLogic Heap Validator]. As described above, the user typically inputs repository identification information into the fields 2102 provided. Inputting the repository identification information enables the system of the present invention to identify one or more repositories to be validated. The repository identification information may include a variety of identifying information, such as an environment and/or the like. The interface 2100 may further include a key 2104 for identifying various determined metrics or for interpreting a generated validation report. The user may then select to initiate validation 2106. The system of the present invention may not require a user selection of an action to be performed (e.g., validation criteria) based on the type of validation to be executed for a particular repository. Instead, the system of the present invention may validate the identified repository according to default validation criteria or other instructions.

FIG. 22 illustrates an exemplary user interface 2200 for a twenty-first validation application [Incident Tracker]. The user typically views a summary 2202 of incidents. The summary may include information such as a reference number, a component, impacted servers, and actions required to restore service. The user may be enabled to select, add 2204, or delete 2206 various incidents from the summary 2202. The system of the present invention may further enable the user to add a new incident to the summary by completing the new issue form 2208 and submitting it 2210 upon completion.

As illustrated in FIG. 23, the system of the present invention further includes a bookmark page menu 2300 from which the user may select a repository associated with a particular application (or environment, object store, storage location, server, or the like). In this way, the user may more quickly navigate to a desired repository that is to be validated by the system of the present invention. Furthermore, the system of the present invention may automatically prefill the interfaces of FIGS. 2 through 22 with repository identification information based on the user's selection from the bookmark page menu 2300.

Lastly, the system of the present invention may be integrated with a financial data system that stores large volumes of account information, contact information, transaction information, storage information, or the like associated with the entity. In this way, the system of the present invention is configured to receive, store, and transmit information between various devices and storage (e.g., memory) locations.

FIG. 24 is an exemplary block diagram illustrating technical components of a system 2400 for implementing the system of the present invention for researching and resolving an error case as described in process flow 100 of FIG. 1, as well as the exemplary interfaces 200-2200 as illustrated in FIGS. 2 through 22. As illustrated, the system environment 2400 includes a network 2410, a system 2420, and a user input system 2430.

As shown in FIG. 24, the system 2420, and the user input system 2430 are each operatively and selectively connected to the network 2410, which may include one or more separate networks. In addition, the network 2410 may include a telecommunication network, local area network (LAN), a wide area network (WAN), and/or a global area network (GAN), such as the Internet. It will also be understood that the network 2410 is secure and may also include wireless and/or wireline and/or optical interconnection technology.

FIG. 24 also illustrates a system 2420, in accordance with an embodiment of the present invention. The system 2420 may refer to the "system of the present invention" described herein. The system 2420 may include any computerized apparatus that can be configured to perform any one or more of the functions of the system 2420 described and/or contemplated herein. In accordance with some embodiments, for example, the system 2420 may include a computer network, an engine, a platform, a server, a database system, a front end system, a back end system, a personal computer system, and/or the like. Therefore, the system 2420 may be a server managed by the entity. The system 2420 may be located at the facility associated with the entity or remotely from the facility associated with the entity. In some embodiments, such as the one illustrated in FIG. 24, the system 2420 includes a communication interface 2422, a processor 2424, and a memory 2426, which includes a system application 2428 and a datastore 2429 stored therein. As shown, the communication interface 2422 is operatively and selectively connected to the processor 2424, which is operatively and selectively connected to the memory 2426.

It will be understood that the system application 2428 may be configured to implement any one or more portions of the various user interfaces and/or process flow described herein. The system application 2428 may interact with the user application 2438. It will also be understood that, in some embodiments, the memory includes other applications. It will also be understood that, in some embodiments, the system application 2428 is configured to communicate with the datastore 2429, the user input system 2430, or the like.

It will be further understood that, in some embodiments, the system application 2428 includes computer-executable program code portions for instructing the processor 2424 to perform any one or more of the functions of the system application 2428 described and/or contemplated herein. In some embodiments, the system application 2428 may include and/or use one or more network and/or system communication protocols.

In addition to the system application 2428, the memory 2426 also includes the datastore 2429. As used herein, the datastore 2429 may be one or more distinct and/or remote datastores. In some embodiments, the datastore 2429 is not located within the system and is instead located remotely from the system. In some embodiments, the datastore 2429 stores information or data described herein.

It will be understood that the datastore 2429 may include any one or more storage devices, including, but not limited to, datastores, databases, and/or any of the other storage devices typically associated with a computer system. It will also be understood that the datastore 2429 may store information in any known way, such as, for example, by using one or more computer codes and/or languages, alphanumeric character strings, data sets, figures, tables, charts, links, documents, and/or the like. Further, in some embodiments, the datastore 2429 may include information associated with one or more applications, such as, for example, the system application 2428. It will also be understood that, in some embodiments, the datastore 2429 provides a substantially real-time representation of the information stored therein, so that, for example, when the processor 2424 accesses the datastore 2429, the information stored therein is current or substantially current.

It will be understood that the embodiment of the system environment illustrated in FIG. 24 is exemplary and that other embodiments may vary. As another example, in some embodiments, the system 2420 includes more, less, or different components. As another example, in some embodiments, some or all of the portions of the system environment 2400 may be combined into a single portion. Likewise, in some embodiments, some or all of the portions of the system 2420 may be separated into two or more distinct portions.

In addition, the various portions of the system environment 2400 may be maintained for and/or by the same or separate parties. It will also be understood that the system 2420 may include and/or implement any embodiment of the present invention described and/or contemplated herein. For example, in some embodiments, the system 2420 is configured to implement any one or more of the embodiments of the process flow 100 described and/or contemplated herein. Additionally, the system 2420 or the user input system 2430 is configured to initiate presentation of any of the user interfaces described herein.

The user input system 2430 may include any computerized apparatus that can be configured to perform any one or more of the functions of the user input system 2430 described and/or contemplated herein. For example, the user 2435 may use the user input system 2430 (e.g., a mobile device) to transmit and/or receive information or commands to and from the system 2420. In some embodiments, for example, the user input system 2430 may include a personal computer system (e.g. a non-mobile or non-portable computing system, or the like), a mobile computing device, a personal digital assistant, a mobile phone, a tablet computing device, a network device, a wearable computing device, a sensor, and/or the like. As illustrated in FIG. 24, in accordance with some embodiments of the present invention, the user input system 2430 includes a communication interface 2432, a processor 2434, a memory 2436 having a user application 2438 stored therein, and a user interface 2439. In such embodiments, the communication interface 2432 is operatively and selectively connected to the processor 2434, which is operatively and selectively connected to the user interface 2439 and the memory 2436. In some embodiments, the user 2435 may use the user application 2438 to execute processes described with respect to the process flow and interfaces described herein. Specifically, the user application 2438 executes the process flow described in FIG. 1.

Each communication interface described herein, including the communication interface 2432, generally includes hardware, and, in some instances, software, that enables the user input system 2430, to transport, send, receive, and/or otherwise communicate information to and/or from the communication interface of one or more other systems on the network 2410. For example, the communication interface 2432 of the user input system 2430 may include a wireless transceiver, modem, server, electrical connection, and/or other electronic device that operatively connects the user input system 2430 to another system such as the system 2420. The wireless transceiver may include a radio circuit to enable wireless transmission and reception of information. Each processor described herein, including the processor 2434, generally includes circuitry for implementing the audio, visual, and/or logic functions of the user input system 2430. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 2438 of the memory 2436 of the user input system 2430.

Each memory device described herein, including the memory 2436 for storing the user application 2438 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 24, the memory 2436 includes the user application 2438. In some embodiments, the user application 2438 includes an interface for communicating with, navigating, controlling, configuring, and/or using the user input system 2430. In some embodiments, the user application 2438 includes computer-executable program code portions for instructing the processor 2434 to perform one or more of the functions of the user application 2438 described and/or contemplated herein. In some embodiments, the user application 2438 may include and/or use one or more network and/or system communication protocols.

Also shown in FIG. 24 is the user interface 2439. In some embodiments, the user interface 2439 includes one or more output devices, such as a display and/or speaker, for presenting information to the user 2435. In some embodiments, the user interface 2439 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 2435. In some embodiments, the user interface 2439 includes the input and display devices of a mobile device, which are operable to receive and display information.

Also shown in FIG. 24 is a user 2435 of the user input system 2430. The user input system 2430 may be any computing device. The user 2435 may be a person who uses the user input system 2430 to execute a user application 2438. The user application 2438 may be an application to communicate with the system 2420, perform a transaction, input information onto a user interface presented on the user input system 2430, receive and/or transmit information, the like. The user application 2438 and/or the system application 2428 may incorporate one or more parts of any process flow described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms “a” and/or “an” shall mean “one or more,” even though the phrase “one or more” is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for executing a validation process for validating one or more repositories to ensure proper and consistent functionality of one or more repositories, the system comprising:

at least one memory;

at least one processor; and at least one module stored in memory, executable by the at least one processor, and configured to cause said at least one processor to:

electronically receive, from a networked environment of one or more computing devices, repository identification information, wherein the repository identification information comprises information associated with one or more repositories, wherein the information comprises one or more parameters within which each of the one or more repositories are expected to function, wherein the repository identification information is assigned, via a user computing device, to the one or more repositories, wherein assigning further comprises:

establishing an electronic communication link with the user computing device:

initiating, via the established communication link, a user interface for display on the user computing device, the user interface comprising at least one or more selectable pieces of information to be assigned to the repository and one or more options to schedule a validation process; and receiving, via the user interface, an input indicating identification information associated with the one or more repositories and information associated with validating the one or more repositories;

identify at least one repository to be validated based on the received repository identification information;

electronically receive one or more validation criteria for validating the at least one repository to be validated;

generate a validation request to validate the identified at least one repository, wherein the validation request comprises generating a script of identification associated with the at least one repository identified and the one or more validation criteria for validating the at least one identified repository;

initiate, via the user computing device, the validation process based on at least generating the validation request, wherein the validation process comprises initiating the execution of the one or more validation criteria, wherein validating further comprises:

establishing a communication link with the at least one identified repository to enable transfer of information to and from the at least one identified repository; and validating the repository by executing the generated script evaluating various functions of the repository, and confirming that the various functions of the repository comply with the one or more assigned repository parameters associated with the at least one repository; and generate a validation report of the at least one identified repository based on validation of the at least one identified repository to be validated.

2. The system of claim 1, wherein the repository identification information comprises at least one of an environment name, an application name, a file name, a database name, web logic, an object store name, a storage policy, an Internet Protocol (IP) address, user authentication information, and user identification (ID) associated with the at least one repository to be validated.

3. The system of claim 2, wherein the one or more validation criteria comprises instructions to execute at least one of adding, deleting, retrieving, and downloading data to or from the at least one repository to be validated, viewing data stored in the at least one repository to be validated, searching for data stored in the at least one repository to be validated, viewing security and authentication preferences of the at least one repository to be validated, determining a pool capacity, an amount of free space, a version, a status, a name, an identification number, or read and write capabilities of the at least one repository to be validated, validating user credentials for user access to the at least one repository to be validated, validating a session specification, retrieving group information for a user, and starting, stopping, or pausing operation of the at least one repository to be validated.

4. The system of claim 3, wherein the module is further configured for:

determining if the at least one repository to be validated has been validated;

requesting from a user one or more validation criteria for validating the at least one repository to be validated and validating the at least one repository to be validated based the one or more validation criteria when it is determined that the at least one repository to be validated has not been validated; and generating a validation report based on validation of the at least one repository to be validated when it is determined that the at least one repository to be validated has been validated.

5. The system of claim 1, wherein the module is further configured for generating a validation request based on the received repository identification information and received one or more validation criteria for validating the at least one repository to be validated.

6. The system of claim 1, wherein at least one of the repository identification information and the one or more validation criteria for validating the at least one repository to be validated is received from a mobile device associated with a user.

7. The system of claim 1, wherein generating the validation report comprises generating a log of the validation of the at least one repository to be validated based on the one or more validation criteria.

8. The system of claim 1, wherein the module is further configured for transmitting the validation report to a second apparatus after generation of the validation report.

9. The system of claim 3, wherein validating the at least one repository to be validated further comprises:

generating at least one validation repository;

associating the at least one validation repository with the at least one repository to be validated; and utilizing only the validation repository when executing the one or more validation criteria during validation of the at least one repository to be validated.

10. The system of claim 1, wherein the repository identification information is received based on a user selection from a bookmark page.

11. The system of claim 1, wherein the module is further configured for:

identifying one or more errors associated with the repository to be validated; and enabling an authenticated user to correct the one or more identified errors.

12. A method for validating a repository, the method comprising:

electronically receiving, from a networked environment of one or more computing devices, repository identification information, wherein the repository identification information comprises information associated with one or more repositories, wherein the repository identification information is assigned, via a user computing device, to the one or more repositories, wherein assigning further comprises:

establishing an electronic communication link with the user computing device;

initiating, via the established communication link, a user interface for display on the user computing device, the user interface comprising at least one or more selectable pieces of information to be assigned to the repository and one or more options to schedule a validation process; and receiving, via the user interface, an input indicating identification information associated with the one or more repositories and information associated with validating the one or more repositories;

identifying, by a computing device processor, at least one repository to be validated based on the received repository identification information;

electronically receiving, by a computing device processor, one or more validation criteria for validating the at least one repository to be validated, wherein the one or more validation criteria comprises one or more instructions for execution the validation process;

generating, using a computing device processor, a validation request to validate the identified at least one repository, wherein the validation request comprises generating a script of identification associated with the at least one repository identified and the one or more validation criteria for validating the at least one identified repository;

initiate, via the user computing device, the validation process based on at least generating the validation request, wherein the validation process comprises initiating the execution of the one or more validation criteria, wherein validating further comprises:

establishing a communication link with the at least one identified repository to enable transfer of information to and from the at least one identified repository; and validating the repository by executing the generated script evaluating various functions of the repository, and confirming that the various functions of the repository comply with the one or more assigned repository parameters associated with the at least one repository; and generating, by a computing device processor, a validation report of the at least one identified repository based on validation of the at least one identified repository to be validated.

13. The method of claim 12, wherein the repository identification information comprises at least one of an environment, an application, a file, a database, web logic, an object store, a storage policy, an Internet Protocol (IP) address, user authentication information, and a user identification (ID) associated with the at least one repository to be validated.

14. The method of claim 13, wherein the one or more validation criteria comprises non-transitory, computing device-executable instructions to execute at least one of adding, deleting, retrieving, and downloading data to or from the at least one repository to be validated, viewing data stored in the at least one repository to be validated, searching for data stored in the at least one repository to be validated, viewing security and authentication preferences of the at least one repository to be validated, determining a pool capacity, an amount of free space, a version, a status, a name, an identification number, or read and write capabilities of the at least one repository to be validated, validating user credentials for user access to the at least one repository to be validated, validating a session specification, retrieving group information for a user, and starting, stopping, or pausing operation of the at least one repository to be validated.

15. The method of claim 14, further comprising:

determining, by a computing device processor, if the at least one repository to be validated has been validated;

requesting, by a computing device processor, from a user one or more validation criteria for validating the at least one repository to be validated and validating the at least one repository to be validated based the one or more validation criteria when it is determined that the at least one repository to be validated has not been validated; and generating, by a computing device processor, a validation report based on validation of the at least one repository to be validated when it is determined that the at least one repository to be validated has been validated.

16. A computer program product for validating a repository, the computer program product comprising a non-transitory computer-readable medium comprising code causing an apparatus to:

electronically receive, from a networked environment of one or more computing devices, repository identification information, wherein the repository identification information comprises information associated with one or more repositories, wherein the repository identification information is assigned, via a user computing device, to the one or more repositories, wherein assigning further comprises:

establishing an electronic communication link with the user computing device:

initiating, via the established communication link, a user interface for display on the user computing device, the user interface comprising at least one or more selectable pieces of information to be assigned to the repository and one or more options to schedule a validation process; and receiving, via the user interface, an input indicating identification information associated with the one or more repositories and information associated with validating the one or more repositories;

identify at least one repository to be validated based on the received repository identification information;

electronically receive one or more validation criteria for validating the at least one repository to be validated, wherein the one or more validation criteria comprises one or more instructions for execution the validation process;

generate a validation request to validate the identified at least one repository, wherein the validation request comprises generating a script of identification associated with the at least one repository identified and the one or more validation criteria for validating the at least one identified repository;

initiate, via the user computing device, the validation process based on at least generating the validation request, wherein the validation process comprises initiating the execution of the one or more validation criteria, wherein validating further comprises:

establishing a communication link with the at least one identified repository to enable transfer of information to and from the at least one identified repository; and validating the repository by executing the generated script evaluating various functions of the repository, and confirming that the various functions of the repository comply with the one or more assigned repository parameters associated with the at least one repository; and generate a validation report of the at least one identified repository based on validation of the at least one identified repository to be validated.

17. The computer program product of claim 16, wherein the repository identification information comprises at least one of an environment, an application, a file, a database, web logic, an object store, a storage policy, an Internet Protocol (IP) address, user authentication information, and a user identification (ID) associated with the at least one repository to be validated.

18. The computer program product of claim 17, wherein the one or more validation criteria comprises instructions to execute at least one of adding, deleting, retrieving, and downloading data to or from the at least one repository to be validated, viewing data stored in the at least one repository to be validated, searching for data stored in the at least one repository to be validated, viewing security and authentication preferences of the at least one repository to be validated, determining a pool capacity, an amount of free space, a version, a status, a name, an identification number, or read and write capabilities of the at least one repository to be validated, validating user credentials for user access to the at least one repository to be validated, validating a session specification, retrieving group information for a user, and starting, stopping, or pausing operation of the at least one repository to be validated.

19. The computer program product of claim 18, wherein the non-transitory computer-readable medium comprises code further causing an apparatus to:

determine if the at least one repository to be validated has been validated;

request from a user one or more validation criteria for validating the at least one repository to be validated and validating the at least one repository to be validated based the one or more validation criteria when it is determined that the at least one repository to be validated has not been validated; and generate a validation report based on validation of the at least one repository to be validated when it is determined that the at least one repository to be validated has been validated.

* * * * *